United States Patent
Nakamura

(10) Patent No.: US 12,308,625 B2
(45) Date of Patent: May 20, 2025

(54) ELECTRIC WIRE CONNECTION BODY, METHOD OF MANUFACTURING ELECTRIC WIRE CONNECTION BODY, SENSOR ELEMENT, AND METHOD OF MANUFACTURING SENSOR ELEMENT

(71) Applicant: SHIBAURA ELECTRONICS CO., LTD., Saitama (JP)

(72) Inventor: Kazumasa Nakamura, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/904,026

(22) PCT Filed: Mar. 12, 2021

(86) PCT No.: PCT/JP2021/010057
§ 371 (c)(1),
(2) Date: Aug. 11, 2022

(87) PCT Pub. No.: WO2022/190356
PCT Pub. Date: Sep. 15, 2022

(65) Prior Publication Data
US 2024/0186772 A1     Jun. 6, 2024

(51) Int. Cl.
*H02G 1/14* (2006.01)
*B23K 26/57* (2014.01)
*B29C 65/16* (2006.01)
*H01R 43/02* (2006.01)

(52) U.S. Cl.
CPC .............. *H02G 1/14* (2013.01); *B23K 26/57* (2015.10); *B29C 65/1635* (2013.01); *H01R 43/0221* (2013.01)

(58) Field of Classification Search
CPC .................................. H02G 1/14; B23K 26/57
See application file for complete search history.

(56) References Cited

U.S. PATENT DOCUMENTS

| 2013/0064266 | A1  | 3/2013 | Mori |
| 2016/0148720 | A1* | 5/2016 | Kanagawa ............... H01B 7/04 29/869 |
| 2016/0260528 | A1* | 9/2016 | Widaj ..................... H01R 43/04 |

(Continued)

FOREIGN PATENT DOCUMENTS

| JP | 63220711 A     | 9/1988 |
| JP | H08-148256 A   | 6/1996 |
| JP | 2004-063373 A  | 2/2004 |

(Continued)

OTHER PUBLICATIONS

Machine translation JP2004063373A (Year: 2004).*

(Continued)

*Primary Examiner* — Jacob T Minskey
*Assistant Examiner* — Wayne K. Swier
(74) *Attorney, Agent, or Firm* — McDonald Hopkins LLC

(57) ABSTRACT

An electric wire connection body includes a first electric wire, a second electric wire electrically connected to the first electric wire, a connection portion connecting the first electric wire and the second electric wire, and an insulation coating body covering a periphery of the connection portion. The connection portion is formed by butt welding of the first electric wire and the second electric wire.

9 Claims, 16 Drawing Sheets

(56) References Cited

U.S. PATENT DOCUMENTS

2019/0221981 A1* 7/2019 Schneider .............. H01R 4/022

FOREIGN PATENT DOCUMENTS

| JP | 2008-071700 A | 3/2008 |
|----|---------------|--------|
| JP | 2012-068610 A | 4/2012 |
| JP | 2016162758 A | 9/2016 |
| WO | 2015002180 A1 | 1/2015 |

OTHER PUBLICATIONS

Machine translation JPH08148256A (Year: 1996).*
Machine translation JP2008071700A (Year: 2008).*
International Search Report and Written Opinion for PCT/JP2021/010057 dated May 25, 2021.
Office action for Japanese patent application No. 2021-559983 dated Jan. 13, 2022 and translation thereof.

* cited by examiner (F) (B)

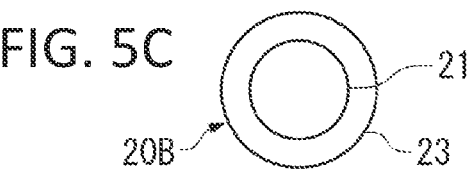
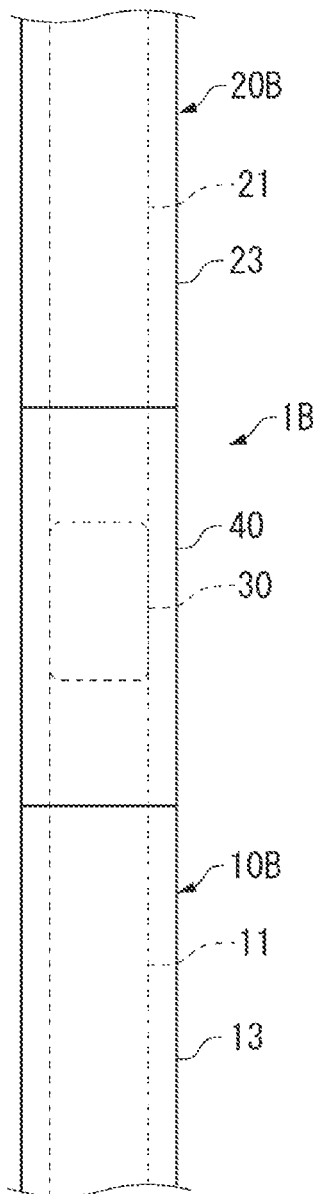
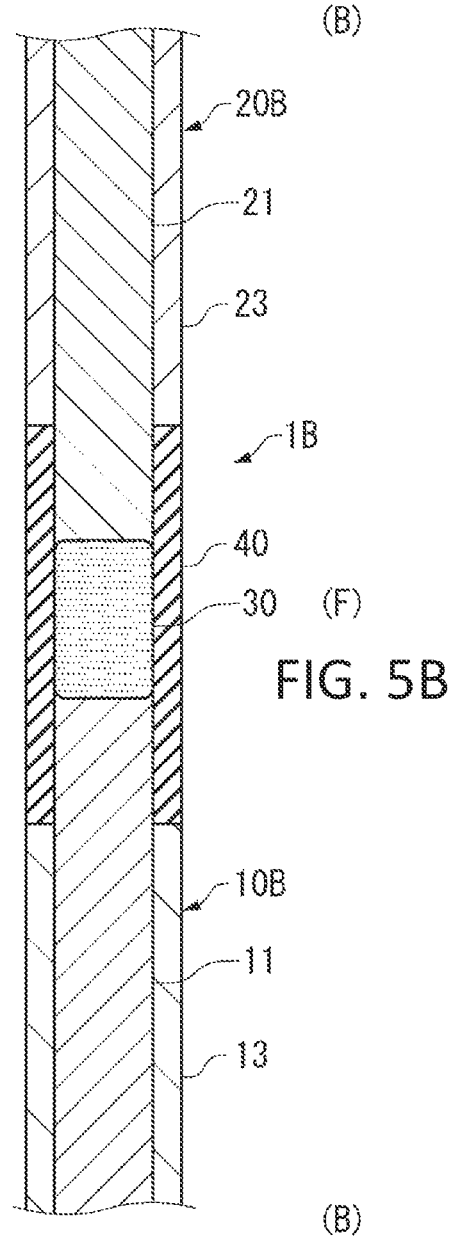
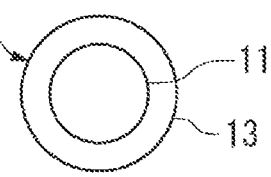

(B) (F) (B)

(B) (F) (B)

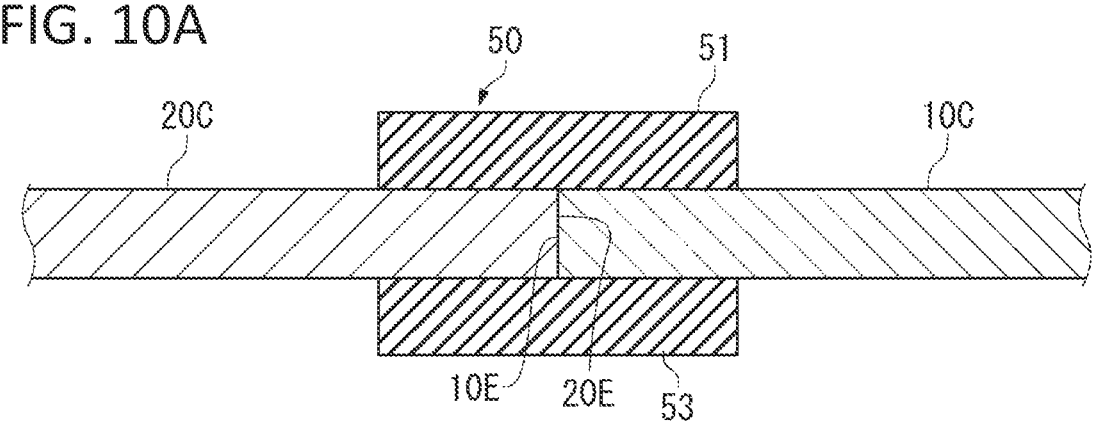
FIG. 10A
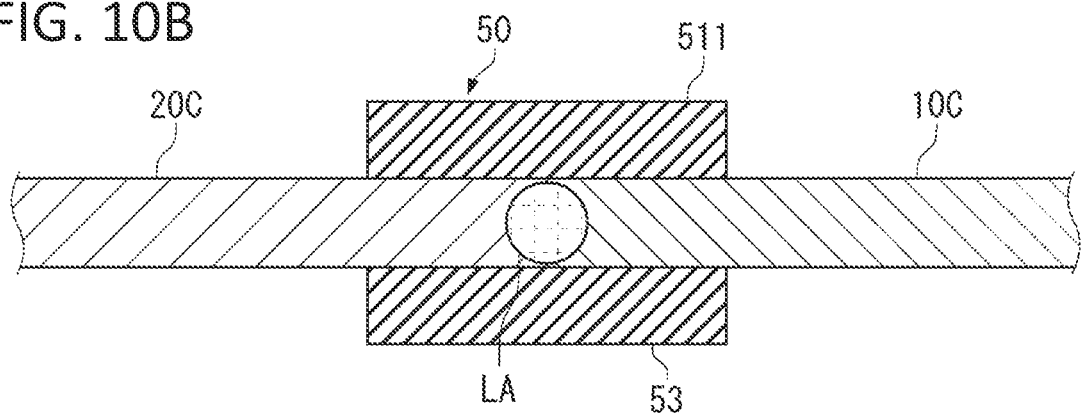
FIG. 10B
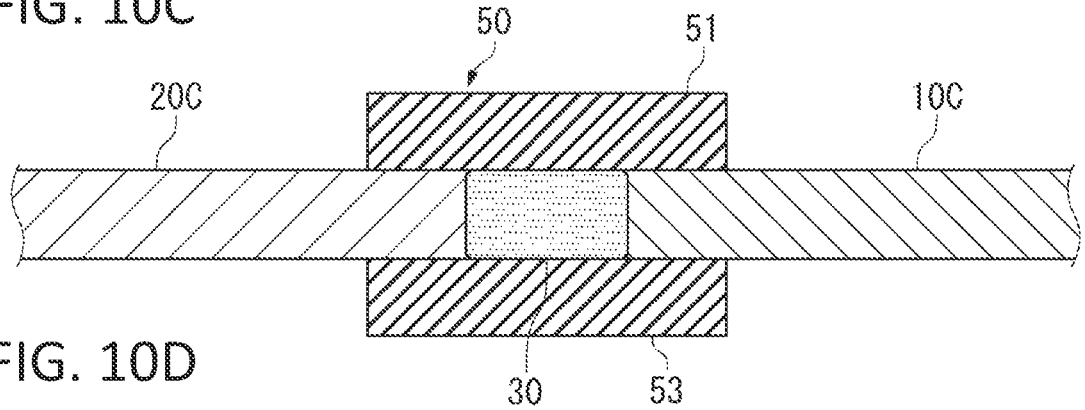
FIG. 10C
FIG. 10D
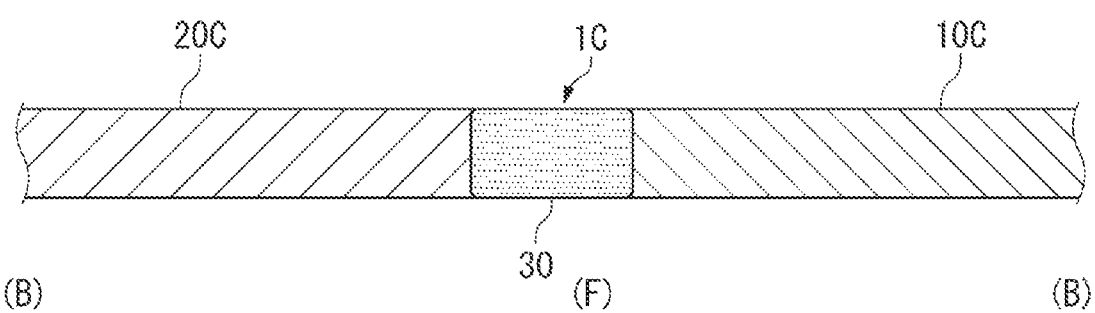

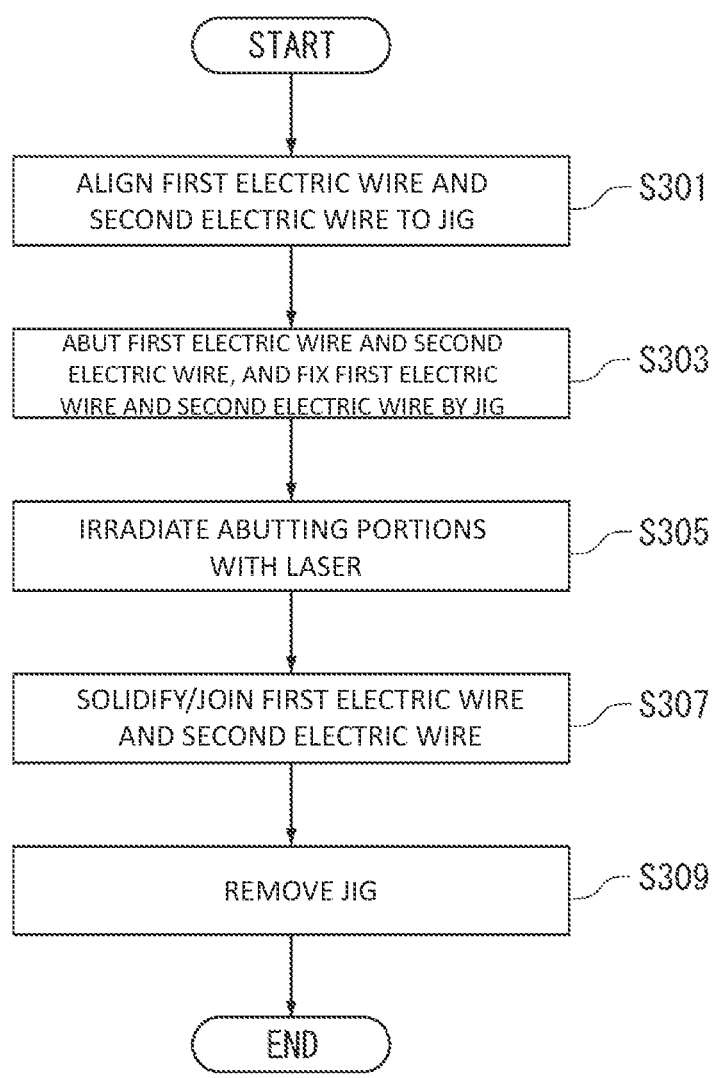

FIG. 12A
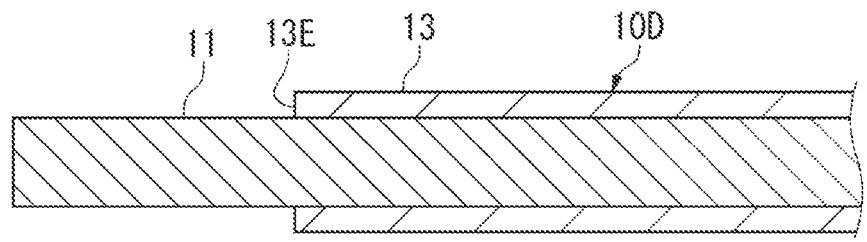
FIG. 12B
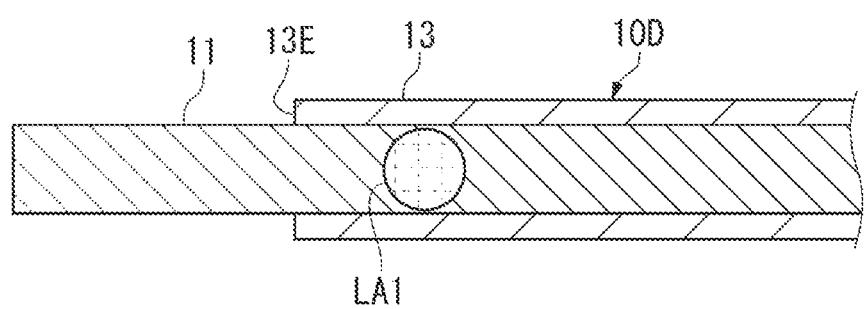
FIG. 12C
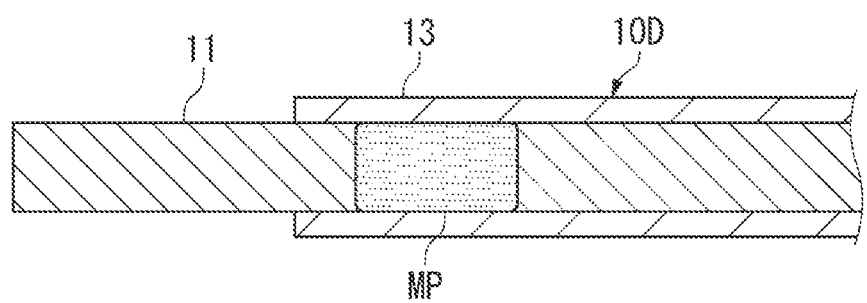
FIG. 12D
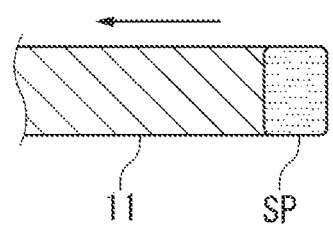
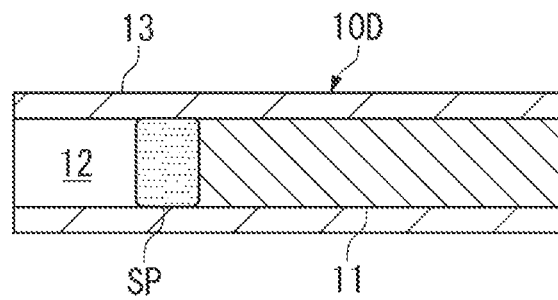
(F)  (B)

(B)　　　　　　　　　(F)　　　　　　　　　(B)

ELECTRIC WIRE CONNECTION BODY, METHOD OF MANUFACTURING ELECTRIC WIRE CONNECTION BODY, SENSOR ELEMENT, AND METHOD OF MANUFACTURING SENSOR ELEMENT

CROSS-REFERENCE TO RELATED APPLICATIONS

This is a National Stage application of PCT international application PCT/JP2021/010057, filed on Mar. 12, 2021, the content of which is incorporated herein by reference in its entirety.

TECHNICAL FIELD

The present invention relates to an electric wire connection body in which front end surfaces are connected by butt welding.

BACKGROUND ART

There are many examples in which end parts of paired separate electric wires are connected and used. Among them, for example, Patent Literature 1 proposes a method of connecting relay wires connected to electrode wires of a temperature sensor and electric conduction wires including stranded lead wires, by resistance welding. The connection method proposed in Patent Literature 1 includes first resistance welding and second resistance welding.

In the first resistance welding, paired welding electrodes are disposed to nip front ends of the electric conduction wires, and a current is caused to flow between the welding electrodes to fuse and join the electric conduction wires each including a core wire, thereby forming an integrated first weld portion.

In the second resistance welding, the electric conduction wires and the relay wires are connected. More specifically, the electric conduction wires and the relay wires are disposed to overlap with each other, welding electrodes used for the second resistance welding are disposed to nip the electric conduction wires and the relay wires at a position on a rear end side of the first weld portion, and a current is caused to flow between the welding electrodes to generate Joule heat, thereby fusing the core wires and the relay wires. As a result, a second weld portion is formed.

In Patent Literature 1, after the second resistance welding, an auxiliary ring having electric insulation property is moved to electrically seal the first weld portion and the second weld portion.

CITATION LIST

Patent Literature

Patent Literature 1: JP 2013-68610 A

SUMMARY OF INVENTION

Technical Problem

The connection method by the resistance welding proposed in Patent Literature 1 requires a work to move the auxiliary ring in addition to a work to remove an insulation coating at the end parts of the lead wires before the first resistance welding. Further, in the connection method proposed in Patent Literature 1, the electric conduction wires and the relay wires are overlapped with each other, which increases a diameter of a connection portion by a corresponding amount.

Accordingly, an object of the present invention is to provide an electric wire connection body is easily connected by welding and can be reduced in diameter of a weld portion. Further, an object of the present invention is to provide a connection method providing such a connection body.

Solution to Problem

An electric wire connection body according to the present invention includes a first electric wire, a second electric wire electrically connected to the first electric wire, a connection portion connecting the first electric wire and the second electric wire, and an insulation coating body covering a periphery of the connection portion. The connection portion is connected by butt welding of the first electric wire and the second electric wire.

In the present invention, the insulation coating body preferably has an inner diameter equivalent to a wire diameter of one of the first electric wire and the second electric wire, and the connection portion preferably has a wire diameter equivalent to a wire diameter of one of the first electric wire and the second electric wire.

In the present invention, the insulation coating body is preferably an insulation coating body provided on one of the first electric wire and the second electric wire in advance, or a hollow insulation body provided as a separate body having a wire diameter equivalent to a wire diameter of an insulation coating body of each of the first electric wire and the second electric wire.

In the present invention, the insulation coating body is preferably made of a fluorine resin or glass.

In the present invention, preferably, an insulation coating body of the first electric wire has lower laser absorptivity than laser absorptivity of a core wire of the first electric wire.

The present invention provides a sensor element including a detector, and a pair of electric wire connection bodies electrically connected to the detector. As the electric wire connection bodies, the electric wire connection bodies according to the present invention are adopted.

The present invention provides a method of manufacturing an electric wire connection body in which a first electric wire and a second electric wire are connected by butt welding. The method includes: an abutting step of abutting a front end surface of the first electric wire and a front end surface of the second electric wire on each other; and an irradiation step of irradiating the first electric wire and the second electric wire abutted on each other, with laser to form a connection portion by welding.

In the present invention, at least before the irradiation step, a region where the connection portion is to be formed is covered with an insulation coating body.

The insulation coating body according to the present invention is preferably an insulation coating body provided on one of the first electric wire and the second electric wire in advance. In this case, after a pocket formation step of forming a gap where no core wire is present inside the insulation coating body by irradiating a core wire covered with the insulation coating body with laser through the insulation coating body, the abutting step of abutting the front end surface of the first electric wire and the front end surface of the second electric wire on each other can be performed in the gap.

In the pocket formation step according to the present invention, preferably, the gap is formed by reduction in volume with melting and solidification of the core wire caused by irradiation of a front end part of the core wire with the laser.

In the pocket formation step according to the present invention, preferably, the gap is formed by fusing the core wire by irradiation of the core wire with the laser, and removing the core wire on a front end side of a fused part.

In the present invention, preferably, the insulation coating body is provided separately from an insulation coating body of each of the first electric wire and the second electric wire. In this case, in the abutting step, an exposed core wire of the first electric wire and an exposed core wire of the second electric wire are abutted on each other inside the separate insulation coating body.

In the present invention, preferably, the insulation coating body comprises a jig made of a material allowing the laser to pass therethrough, the jig being provided separately from an insulation coating body of each of the first electric wire and the second electric wire. In this case, in the abutting step, an exposed core wire of the first electric wire and an exposed core wire of the second electric wire are abutted on each other inside the jig. Thereafter, in the irradiation step, the core wires are irradiated with the laser through the jig.

The present invention provides a method of manufacturing a sensor element in which paired electric wire connection bodies are electrically connected to a detector. The electric wire connection bodies are connected to the detector by the method of manufacturing the electric wire connection body described above.

Advantageous Effects of Invention

According to the present invention, it is possible to provide the electric wire connection body that is easily connected by welding and can be reduced in diameter of a weld portion.

BRIEF DESCRIPTION OF DRAWINGS

FIGS. 5A to 5D are diagrams each illustrating an electric wire connection body according to a second embodiment of the present invention.

FIGS. 10A to 10D are diagrams each to explain the manufacturing method according to the third embodiment, subsequent to FIG. 9B.

FIG. 11 is a flowchart illustrating a procedure of the manufacturing method according to the third embodiment.

FIGS. 12A to 12D are diagrams each to explain a manufacturing method according to a fourth embodiment of the present invention.

DESCRIPTION OF EMBODIMENTS

Figure 1C:
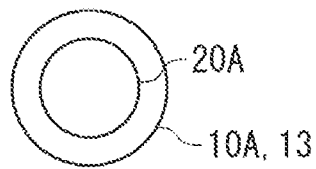
FIGS. 1A to 1D are diagrams each illustrating an electric wire connection body according to a first embodiment of the present invention.

Embodiments of an electric wire connection body and a method of manufacturing the electric wire connection body according to the present invention are described below with reference to drawings. In the embodiments, the electric wire connection body is obtained by melting and solidifying metal portions of paired wires by laser beam irradiation. To melt and solidify the metal portions of the paired wires, connection parts of the paired wires are held by an insulation coating body made of a resin material or the like that allows the laser beam (hereinafter, simply referred to as laser) to pass therethrough. As a result, the insulation coating body guides and aligns the connection parts of the paired wires, which makes it possible to easily connect the connection parts in an abutting state.

In the following, four embodiments are described in order, and then specific application examples of the electric wire connection body according to any of the embodiments are described.

First Embodiment: FIGS. 1A to 1D, FIGS. 2A to 2C, FIGS. 3A to 3C, and FIG. 4

As illustrated in FIGS. 1A to 1D, an electric wire connection body 1A according to a first embodiment includes a first electric wire 10A and a second electric wire 20A electrically connected to the first electric wire 10A. A core wire 11 of the first electric wire 10A and the second electric wire 20A are mechanically and electrically connected by a connection portion 30 housed inside an insulation coating body 13. Note that, as for the wires, a side of the first electric wire 10A connected to the second electric wire 20A is defined as a front side (F), and a side opposite thereto is defined as a rear side (B).

[First Electric Wire 10A, Second Electric Wire 20A, and Connection Portion 30: FIGS. 1A to 1D]

The first electric wire 10A includes the core wire 11 and the insulation coating body 13 covering an outer periphery of the core wire 11.

The core wire 11 is made of a metal material excellent in electrical conductivity, for example, copper, a copper alloy, nickel, a nickel alloy, or an iron-based alloy. In addition, a material in which a surface of the metal material is subjected to surface treatment such as plating, for example, a material in which copper or a copper alloy is plated with nickel or tin is usable. As the core wire 11, any of a single wire and a twisted wire is adoptable.

The insulation coating body 13 is made of an electric insulation material that is sufficiently smaller in laser absorptivity than the core wire 11. This is because, in the present embodiment, when the core wire 11 of the first electric wire 10A and the second electric wire 20A are joined by welding with laser irradiation, a connection part of the core wire 11 and a connection part of the second electric wire 20A are irradiated with the laser through the insulation coating body 13. The insulation coating body 13 is made of a material that can achieve the object, for example, a resin material such as acrylic, PC (polycarbonate), PVC (polyvinyl chloride), PET (polyethylene terephthalate), PE (polyethylene), and PP (polypropylene), a fluorine resin, and glass.

Examples of the fluorine resin include PTFE (polytetrafluoroethylene) and PFA (tetrafluoroethylene-perfluoro(alkyl vinyl ether) copolymer). Among them, glass or the fluorine resin is preferable in terms of heat resistance.

Here, an example in which the insulation coating body 13 has an inner diameter equivalent to a wire diameter of the second electric wire 20A is illustrated; however, the wire diameter of the second electric wire 20A may be smaller than the inner diameter of the insulation coating body 13 as illustrated in an application example described below. The wire diameter used herein means a diameter.

In the present embodiment, the second electric wire 20A only includes a conductor, and is made of a metal material similar to the metal material of the core wire 11. An outer diameter (R20) of the second electric wire 20A and an outer diameter (R11) of the core wire 11 according to the first embodiment preferably have relationship of R20≤R11. The relationship is caused by a method of manufacturing the electric wire connection body 1A described below. Further, in the present embodiment, the outer diameters R11 and R20 are not limited, and front end surfaces of the core wire 11 and the second electric wire 20A that are thin wires each having an outer diameter of 5 mm or less, even 3 mm or less, can be abutted and joined by the method of manufacturing the electric wire connection body 1A.

A connection destination of a part ahead of a break line of each of the first electric wire 10A and the second electric wire 20A is optional, and each of the first electric wire 10A and the second electric wire 20A can be connected to an electric element, a power supply, a measurement device, or the like.

[Connection Portion 30: FIGS. 1A to 1D]

The connection portion 30 connecting the core wire 11 of the first electric wire 10A and the second electric wire 20A is formed by solidifying the core wire 11 and the second electric wire 20A after both of the core wire 11 and the second electric wire 20A are melted. The front end surface of the core wire 11 and the front end surface of the second electric wire 20A abut on each other through the connection portion 30. Melting for formation of the connection portion 30 is performed by irradiation with laser (Light Amplification by Stimulated Emission of Radiation) as described below.

Figure 1A:
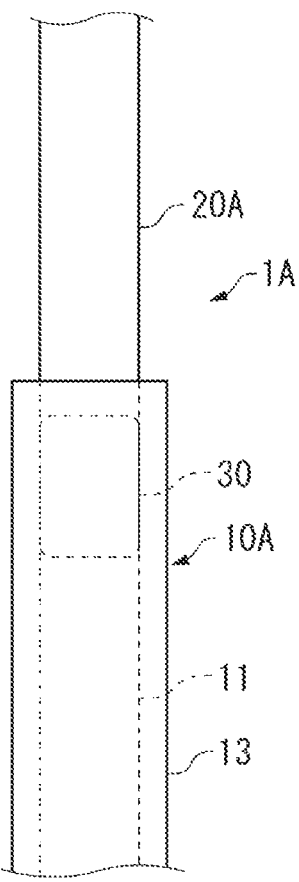
Figure 1B:
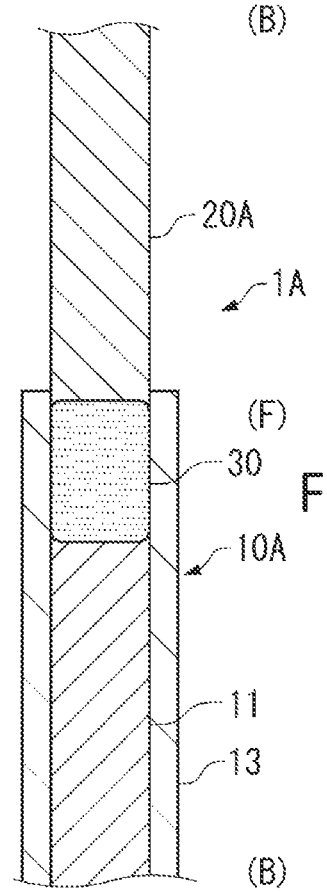
Figure 1D:
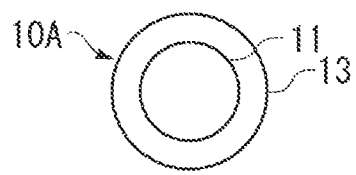

As illustrated in FIGS. 1A and 1B, the connection portion 30 is provided inside the insulation coating body 13 provided on the first electric wire 10A in advance. As described above, the first electric wire 10A and the second electric wire 20A are joined inside the insulation coating body 13. This makes it possible to omit an insulation coating body as a separate member for insulating and covering the connection portion 30. As a result, the outer diameter of the insulation coating body 13 that houses the connection portion 30 is within a range equivalent to an outer diameter of other parts of the insulation coating body 13.

The connection portion 30 is within a range equivalent to outer peripheral surfaces of the core wire 11 and the second electric wire 20A, or within a range slightly exceeding the outer peripheral surfaces. This is because, in a melted state before the connection portion 30 is formed, expansion toward outside in a radial direction is restrained by the insulation coating body 13.

[Method of Manufacturing Electric Wire Connection Body 1A: FIGS. 2A to 2C, FIGS. 3A to 3C, and FIG. 4]

Next, a method of manufacturing the electric wire connection body 1A is described with reference to FIGS. 2A to 2C, FIGS. 3A to 3C, and FIG. 4.

Figure 4:
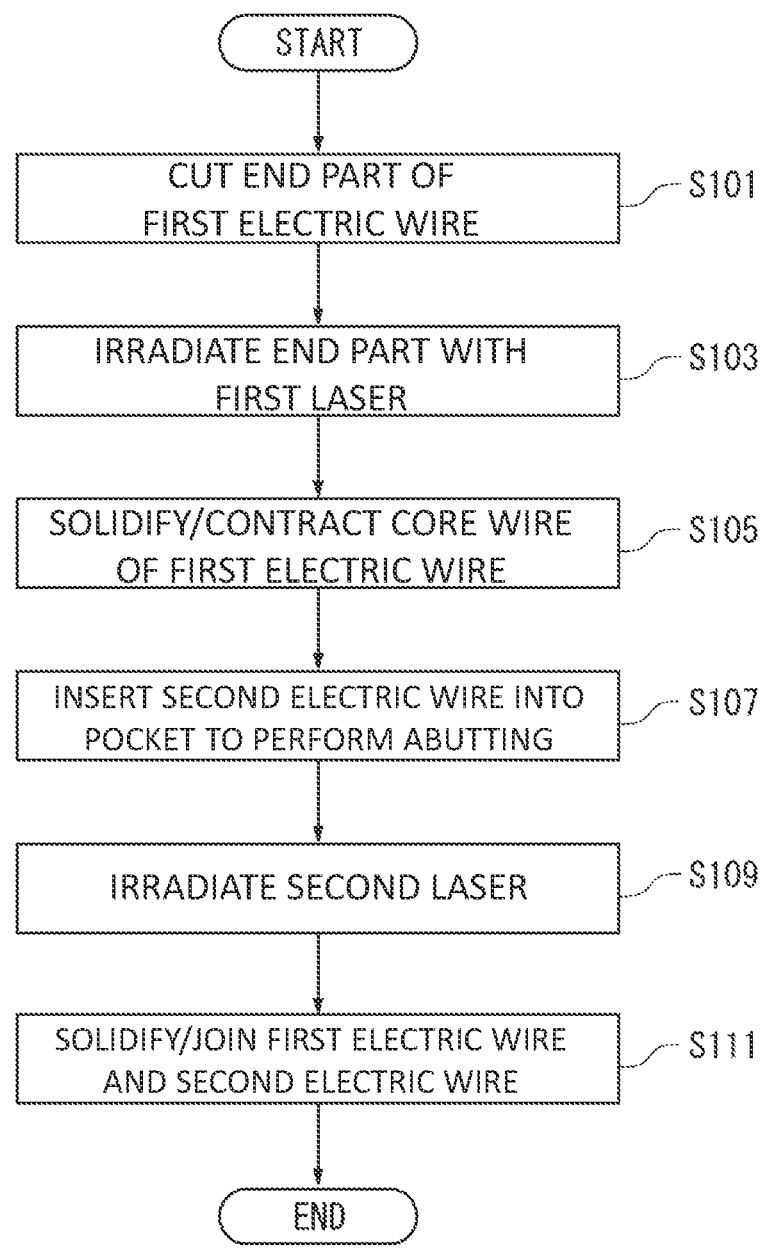
FIG. 4 is a flowchart illustrating a procedure of the manufacturing method according to the first embodiment.

As illustrated in FIG. 4, the manufacturing method includes the following steps.

S101: Step of cutting end part of first electric wire
S103: First laser irradiation step
S105: Step of solidifying/contracting core wire of first electric wire irradiated with laser
S107: Step of inserting front end part of second electric wire into pocket, and abutting front end part of second electric wire on first electric wire
S109: Second laser irradiation step
S111: Step of solidifying/joining portions irradiated with laser In the following, the steps are described in order of S101 to S111 with reference to FIGS. 2A to 2C and FIGS. 3A to 3C.

Figure 2A:
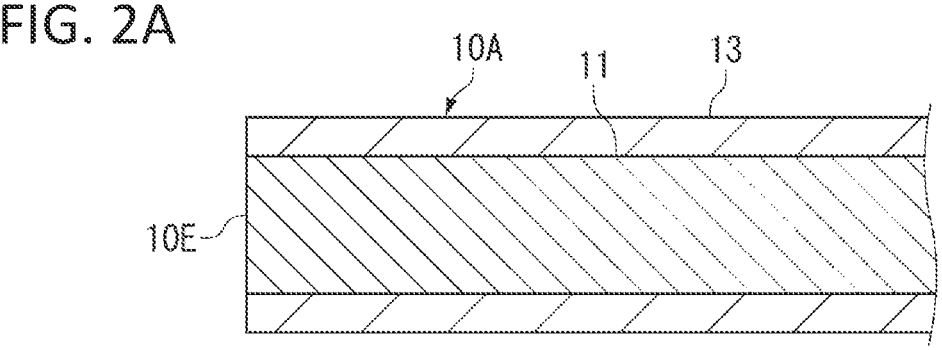
FIGS. 2A to 2C are diagrams each to explain a method of manufacturing the electric wire connection body in FIGS. 1A to 1D according to the first embodiment.

<Step of Cutting End Part of First Electric Wire (S101): FIG. 2A>

First, as illustrated in FIG. 2A, one of end parts of the first electric wire 10A is cut to shape a front end surface 10E into a flat surface. The second electric wire 20A on a counterpart side is similarly processed. As a result, an abutting state of the first electric wire 10A and the second electric wire 20A becomes excellent.

Figure 2B:
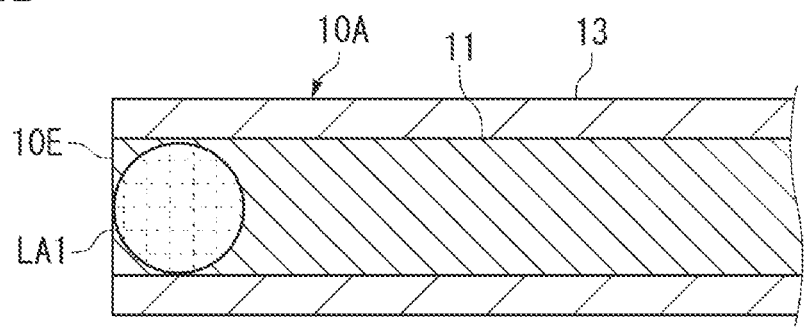

<First Laser Irradiation Step (S103): FIG. 2B>

Next, as illustrated in FIG. 2B, a part facing the front end surface 10E of the first electric wire 10A is irradiated with first laser LA1. The first laser LA1 passes through the insulation coating body 13 and reaches the core wire 11, thereby melting the core wire 11. The irradiated first laser LA1 has a spot diameter necessary to melt the front end surface 10E and the core wire 11 near the front end surface 10E. The first laser LA1 preferably has the spot diameter smaller than or equivalent to a wire diameter of the core wire 11.

As the first laser LA1, for example, yttrium aluminum garnet (YAG) laser that is solid-state laser using YAG is usable. A wavelength of the YAG laser is 1064 nm, and YAG laser absorptivity of the core wire 11 and the insulation coating body 13 has relationship of core wire 11<<insulation coating body 13. The YAG laser absorptivity of each of some materials configuring the core wire 11 and the insulation coating body 13 is as follows.

Note that, as for the materials configuring the core wire 11, reflectance is described together with the absorptivity, and as for the materials configuring the insulation coating body 13, transmittance is described together with the absorptivity. Further, the wavelength of the YAG laser is 1064 nm.

Materials Configuring Core Wire 11 (in Order of Reflectance and Absorptivity)
Stainless; 55%, 45% Nickel; 12%, 88%
Copper; 75%, 25% Aluminum; 74%, 26%

Materials Configuring Insulation Coating Body 13 (in Order of Transmittance and Absorptivity)
PTFE; 90%, 10% PE; 89%, 11% PC; 91%, 9%

PET; 91%, 9% PVC; 53%, 47%

Glass; 92%, 8% Acrylic; 92%, 8%

By irradiation with the first laser LA1, a laser irradiation region of the core wire 11 and a vicinity thereof are melted. Since the core wire 11 is made of a metal material, a temperature when the core wire 11 is melted is high. For example, a melting point of copper is 1084.6° C., and a melting point of nickel is 1455° C. Accordingly, although there is concern about thermal damage of the insulation coating body 13 by melting of the core wire 11, the spot diameter can be narrowed down and the core wire 11 can be melted in a short time, for example, in 10 msec, which makes it possible to suppress thermal damage of the insulation coating body 13.

Figure 2C:
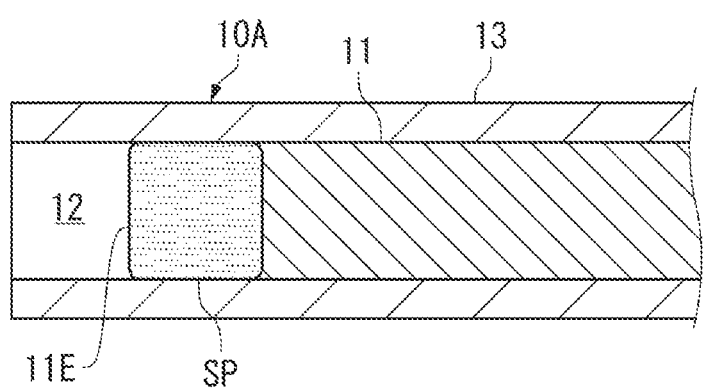

<Step of Solidifying/Contracting Core Wire Irradiated with Laser (S105): FIG. 2C>

After a predetermined time elapses and irradiation with the first laser LA1 is finished, a solidified portion SP is formed as the metal materials configuring the melted core wire 11 are cooled. The solidified portion SP is reduced in volume in a process of solidification as compared with a state of the core wire 11. The reduction in volume occurs toward the rear side (B) of the first electric wire 10A in which the core wire 11 is continued. As a result, a gap is generated by reduction in volume, in an inside of the insulation coating body 13 positioned on the front side (F) of the solidified portion SP. The gap is referred to as a pocket 12 of the first electric wire 10A.

As described above, the step of solidifying/contracting the core wire exerts two functions of a first function to form the solidified portion SP and a second function to form the pocket 12.

Figure 3A:
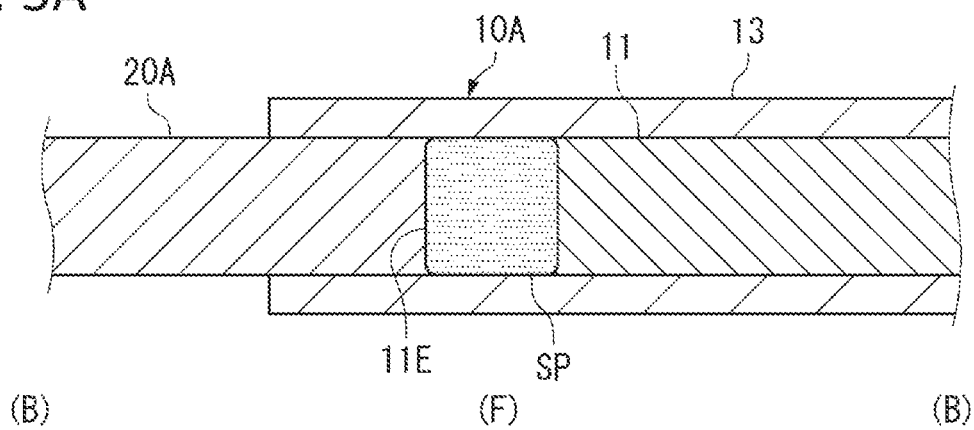
FIGS. 3A to 3C are diagrams each to explain the manufacturing method according to the first embodiment, subsequent to FIG. 2C.

<Step of Inserting Second Electric Wire into Pocket (S107): FIG. 3A>

After the pocket 12 is formed in the first electric wire 10A, the second electric wire 20A to be joined with the first electric wire 10A is inserted into the pocket 12. As illustrated in FIG. 3A, the insertion is performed such that a front end surface 20E of the second electric wire 20A abuts on the solidified portion SP of the first electric wire 10A.

During the insertion of the second electric wire 20A and the abutting of the second electric wire 20A to the solidified portion SP, the insulation coating body 13 around the pocket 12 functions as a guide for the second electric wire 20A. Therefore, according to the present embodiment, once the second electric wire 20A is inserted into the pocket 12, the front end surface 20E of the second electric wire 20A and a front end surface 11E of the solidified portion SP are easily aligned. Note that, in the present embodiment, the example in which the outer diameter (R11) of the core wire 11 of the first electric wire 10A and the outer diameter (R20) of the second electric wire 20A are equal to each other is illustrated; however, the guide function of the pocket 12 and the insulation coating body 13 is effective even when the outer diameter (R20) of the second electric wire 20A is smaller than the outer diameter (R11) of the core wire 11.

Figure 3B:
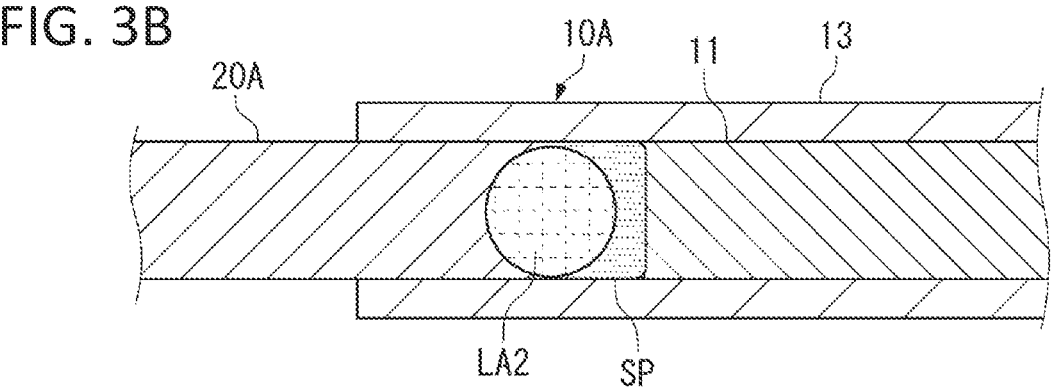

<Second Laser Irradiation Step (S109): FIG. 3B>

After the front end surface 20E of the second electric wire 20A and the solidified portion SP of the first electric wire 10A abut on each other, abutting portions and vicinities thereof between the second electric wire 20A and the solidified portion SP are irradiated with second laser LA2 as illustrated in FIG. 3B. By irradiation with the second laser LA2, a laser irradiation region and a vicinity thereof of the second electric wire 20A and the solidified portion SP are melted, and the second electric wire 20A and the core wire 11 are joined through subsequent solidification. The second laser LA2 can follow an irradiation condition such as a laser type and an irradiation time applied to the first laser LA1.

Figure 3C:
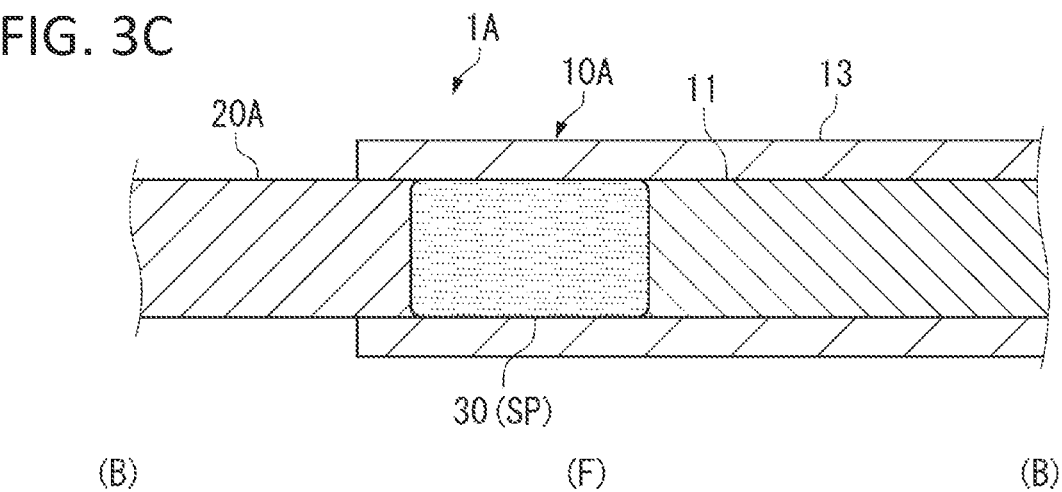

<Step of Solidifying/Joining Portions Irradiated with Laser: FIG. 3C>

After the second laser LA2 is irradiated for a predetermined time and the irradiation with the second laser LA2 is finished, the connection portion 30 is formed as the metal materials configuring the melted second electric wire 20A and the melted core wire 11 are cooled. As a result, the electric wire connection body 1A can be obtained. In the electric wire connection body 1A, the connection portion 30 is disposed inside the insulation coating body 13 provided on the first electric wire 10A in advance.

Effects Achieved by First Embodiment

Effects achieved by the electric wire connection body 1A and the method of manufacturing the electric wire connection body 1A according to the first embodiment are described below.

[Effects Achieved by Electric Wire Connection Body 1A]

<Downsizing and Space Saving of Electric Wire Connection Body 1A>

The insulation coating body 13 can suppress enlargement of the dimension in the radial direction of the insulation coating body 13 of the electric wire connection body 1A. In other words, since the connection portion 30 of the electric wire connection body 1A is covered with the insulation coating body 13 of the first electric wire 10A, the insulation coating body 13 can be within the dimension in the radial direction equivalent to the dimension before the connection portion 30 is formed.

Further, in a case where the electric wire connection body 1A is installed in various devices, the dimension in the radial direction is suppressed, which makes it possible to narrow an installation space. This contributes to downsizing of the devices through the installation space saving.

Further, since the core wire 11 and the second electric wire 20A are connected by butt welding, a connection member, for example, a connection terminal is unnecessary, and the dimension of the connection portion 30 itself in the radial direction can be suppressed.

Furthermore, the connection portion 30 is housed inside the insulation coating body 13. Therefore, in a case where, for example, a sensing element is provided on the other end of the second electric wire 20A, it is possible to reduce a dimension from the front end surface 10E of the first electric wire 10A to the sensing element. A specific example including the sensing element is described below.

<High Responsiveness Corresponding to Application>

In a case where the electric wire connection body 1A is applied to a temperature sensor that is housed in, for example, a metal protective tube protecting the temperature sensor from a surrounding environment, the temperature sensor can be housed in the protective tube having a small diameter. As a result, heat is quickly conducted from the protective tube to a temperature sensor element. This enables temperature measurement with high responsiveness. The electric wire connection body 1A can be applied to a sensing element other than the temperature sensor. In this case, sensing with high responsiveness can be performed.

<Improvement in Withstand Voltage Performance>

In the electric wire connection body 1A, the core wire 11 and the second electric wire 20A are joined by butt welding, and the connection portion 30 is housed inside the insulation coating body 13. Therefore, an outer peripheral surface of the connection portion 30 is flat without a protrusion, and does not have unevenness caused by a connection terminal because no connection terminal is provided. For example, when the connection portion 30 is housed in the insulation coating body 13, an insulation distance between an external environment and the connection portion 30 is hardly reduced. This improves withstand voltage performance.

<Improvement in Stress Resistance of Connection Portion 30>

Since the connection portion 30 is housed inside the insulation coating body 13, stress from outside is hardly applied to the connection portion 30, which reduces risks such as disconnection of the wires at the connection portion 30.

[Effects Achieved by Method of Manufacturing Electric Wire Connection Body 1A]

Next, effects achieved by the method of manufacturing the electric wire connection body 1A described with reference to FIG. 2A to FIG. 4 are described.

<Easiness in Thin Wire Joining>

In the manufacturing method according to the present embodiment, the insulation coating body 13 surrounding the pocket 12 functions as the guide. Therefore, as compared with a case where a functional portion serving as a guide is not provided around the pocket 12, the core wire 11 and the second electric wire 20A are easily aligned. Further, even in a case where the wire diameter of the core wire 11 and the wire diameter of the second electric wire 20A are different from each other, it is possible to reduce influence thereof. Accordingly, thin wires of a conductor and a functional element can be easily joined. For example, thin wires each having a wire diameter of about 0.10 mm can be connected by abutting.

<Simplification in Welding Work>

Generally, it is necessary to abut two wire materials on each other with high accuracy for joining in laser welding of the wire materials. In the manufacturing method, the insulation coating body 13 functions as the guide. This facilitates alignment, and enables simplification of a facility for the alignment. Therefore, welding workability is improved and is easily automated.

In particular, in a case of electric wires each having a small wire diameter, alignment to abut the two wire materials on each other for joining is more difficult. Therefore, effectiveness of the method is increased.

Further, since the connection portion is formed inside the insulation coating body, processing to insulate the connection portion can be omitted.

Second Embodiment: FIGS. 5A to 5D, FIGS. 6A to 6C, FIGS. 7A and 7B, and FIG. 8

Next, an electric wire connection body 1B according to a second embodiment is described.

As illustrated in FIGS. 5A to 5D, the electric wire connection body 1B according to the second embodiment includes a first electric wire 10B and a second electric wire 20B electrically connected to the first electric wire 10B. The core wire 11 of the first electric wire 10B and a core wire 21 of the second electric wire 20B are mechanically and electrically connected by the connection portion 30 housed inside an insulation tube 40. In the electric wire connection body 1B, both of the first electric wire 10B and the second electric wire 20B to be joined with each other include the core wires 11 and 21 and the insulation coating bodies 13 and 23. The insulation tube 40 is provided separately from the first electric wire 10B and the second electric wire 20B.

The first electric wire 10B and the second electric wire 20B can adopt materials and configurations similar to the materials and the configurations of the first electric wire 10A and the second electric wire 20A according to the first embodiment. Therefore, a method of manufacturing the electric wire connection body 1B is described below.

[Method of Manufacturing Electric Wire Connection Body 1B: FIGS. 6A to 6C, FIGS. 7A and 7B, and FIG. 8]

The method of manufacturing the electric wire connection body 1B is described with reference to FIGS. 6A to 6C, FIGS. 7A and 7B, and FIG. 8.

Figure 8:
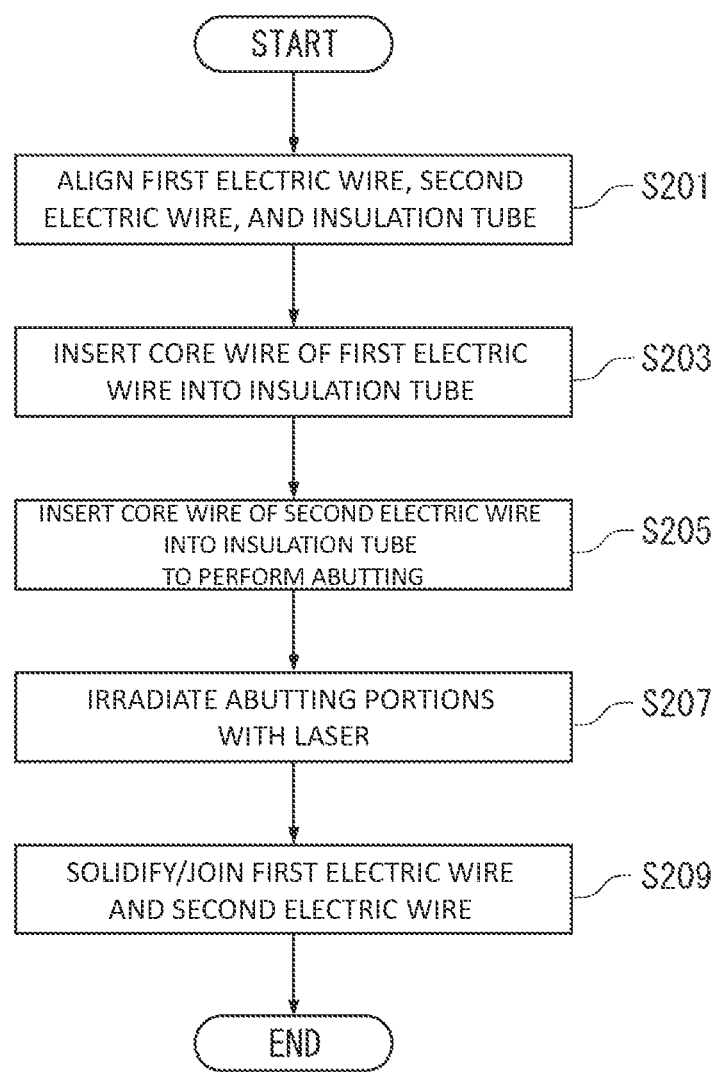
FIG. 8 is a flowchart illustrating a procedure of the manufacturing method according to the second embodiment.

As illustrated in FIG. 8, the manufacturing method includes the following steps.

S201: Step of aligning first electric wire, second electric wire, and insulation tube S203: Step of inserting core wire of first electric wire into insulation tube S205: Step of inserting core wire of second electric wire into insulation tube to perform abutting S207: Step of irradiating abutting portions with laser S209: Step of solidifying region irradiated with laser In the following, the steps are described in order of S201 to S209 with reference to FIGS. 6A to 6C, FIG. 7A and FIG. 7B.

Figure 6A:
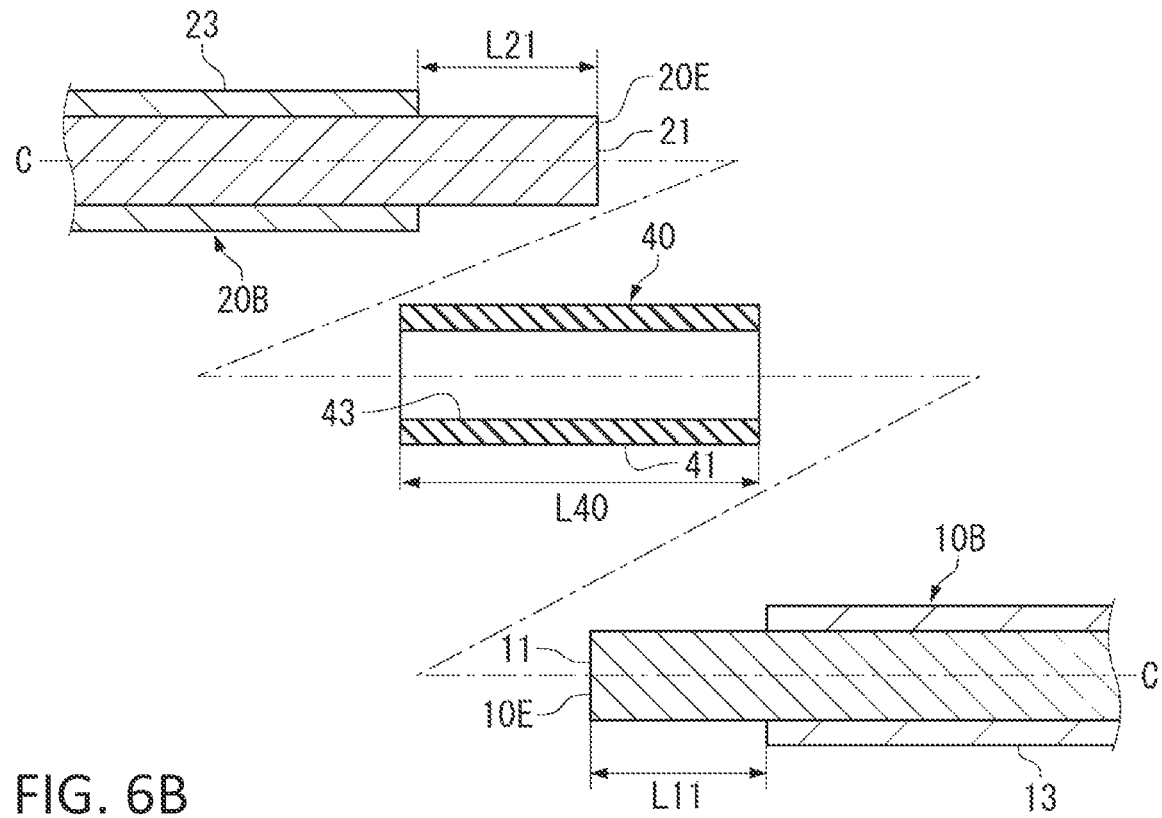
FIGS. 6A to 6C are diagrams each to explain a manufacturing method according to the second embodiment of the present invention.

<Step of Aligning First Electric Wire, Second Electric Wire, and Insulation Tube (S201): FIG. 6A>

First, as illustrated in FIG. 6A, center axes C of the first electric wire 10B, the insulation tube 40, and the second electric wire 20B are aligned. This is to facilitate subsequent insertion of the core wire 11 and the core wire 21 into the insulation tube 40. Before the alignment step, the following processing is performed.

As illustrated in FIG. 6A, the insulation coating body 13 at one of end parts of the first electric wire 10B is stripped off to expose the core wire 11, and the insulation coating body 23 at one of end parts of the second electric wire 20B is stripped off to expose the core wire 21. An exposure amount in a direction of the center axis C is optional. However, after the core wire 11 and the core wire 21 are inserted into the insulation tube 40, it is necessary to abut the front end surfaces 10E and 20E on each other. Therefore, exposure lengths L11 and L21 of the respective core wires 11 and 21 and a total length L40 of the insulation tube 40 have relationship of the following expression (1). Note that, as is obvious from FIGS. 5A and 5B, the electric wire connection body 1B has relationship of an expression (2). As a result, the core wire 11 and the core wire 21 can be covered up with the insulation tube 40. Further, an example in which, in the electric wire connection body 1B, the exposure length L11 of the core wire 11 and the exposure length L21 of the core wire 21 are equal to each other as represented by an expression (3) is illustrated; however, the length L11 and the length L21 may be different from each other.

$$L11+L21 \geq L40 \tag{1}$$

$$L11+L21 = L40 \tag{2}$$

$$L11 = L21 \tag{3}$$

Note that, as a substitute for the insulation tube 40, a tape-shaped insulation material may be wound.

Figure 6B:
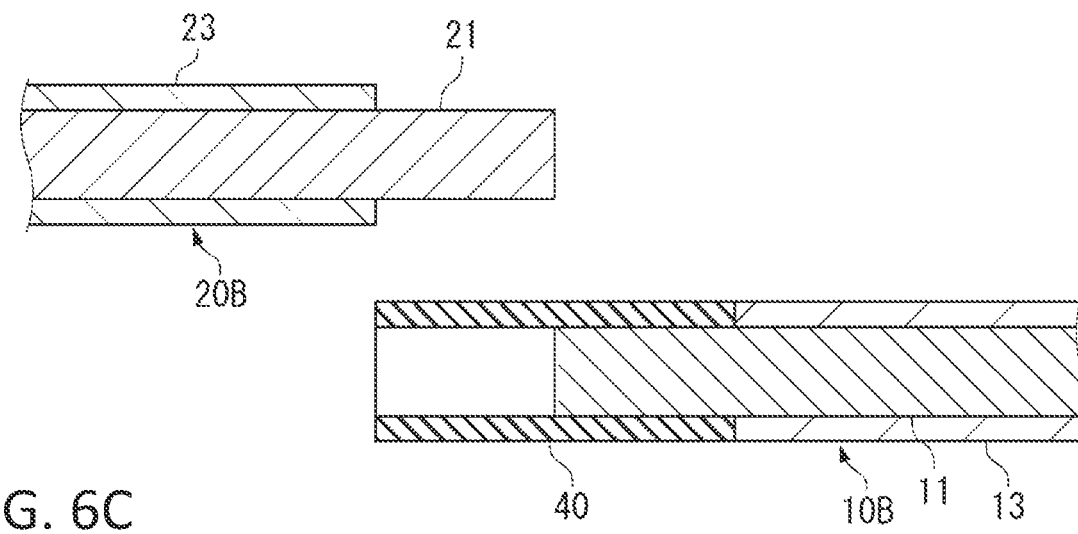

<Step of Inserting Core Wire of First Electric Wire into Insulation Tube (S203): FIG. 6B>

After the first electric wire 10B, the second electric wire 20B, and the insulation tube 40 are aligned, the core wire 11 of the first electric wire 10B is inserted into the insulation tube 40 as illustrated in FIG. 6B. The insertion is performed until the insulation coating body 13 of the first electric wire 10B abuts on the insulation tube 40.

Figure 6C:
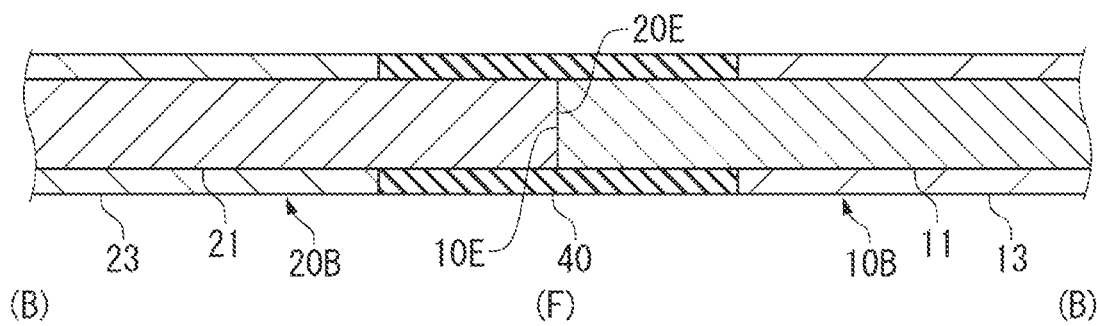

<Step of Inserting Core Wire of Second Electric Wire into Insulation Tube (S205): FIG. 6C>

After the core wire 11 of the first electric wire 10B is inserted into the insulation tube 40, the core wire 21 of the second electric wire 20B is inserted into the insulation tube 40 as illustrated in FIG. 6C. The insertion is performed until the insulation coating body 23 of the second electric wire 20B abuts on the insulation tube 40.

Since the electric wire connection body 1B satisfies the expression (2), the front end surface 10E of the core wire 11 and the front end surface 20E of the core wire 21 abut on each other inside the insulation tube 40. Note that the core wire 11 and the core wire 21 abut on each other at an intermediate point of the total length L40 of the insulation tube 40.

The example in which the first electric wire 10B and the second electric wire 20B are inserted in this order into the insulation tube 40 is described; however, the second electric wire 20B and the first electric wire 10B may be inserted in this order, or the first electric wire 10B and the second electric wire 20B may be inserted at the same time.

Figure 7A:
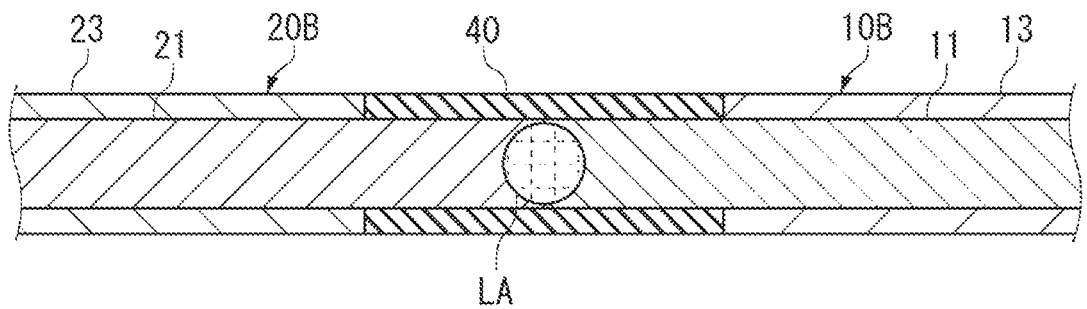
FIGS. 7A and 7B are diagrams each to explain the manufacturing method according to the second embodiment, subsequent to FIG. 6C.

<Step of Irradiating Abutting Portions with Laser (S207): FIG. 7A>

Next, as illustrated in FIG. 7A, a region including abutting portions between the front end surface 10E of the first electric wire 10B and the front end surface 20E of the second electric wire 20B is irradiated with laser LA. The laser LA passes through the insulation tube 40 and reaches the core wire 11 and the core wire 21, thereby melting the core wire 11 and the core wire 21. A condition such as a spot diameter of the irradiated laser LA may be the same as the condition according to the first embodiment.

Figure 7B:
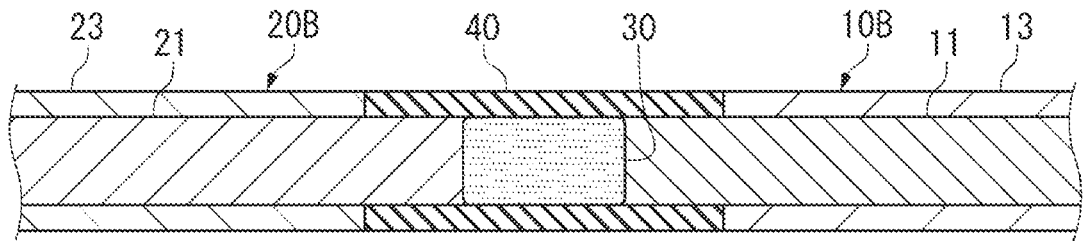

<Step of Solidifying/Joining Portions Irradiated with Laser: FIG. 7B>

After a predetermined time elapses, irradiation with the laser LA is finished. As the metal materials configuring the melted core wire 11 and the melted core wire 21 are cooled, the connection portion 30 is formed, and the electric wire connection body 1B is accordingly obtained. In the electric wire connection body 1B, the connection portion 30 is disposed inside the insulation tube 40, and exposed portions of the core wire 11 and the core wire 21 are covered with the insulation tube 40 without being exposed to outside. The insulation tube 40 preferably has a total length enough to internally house the connection portion 30.

Note that, as a substitute for the insulation tube 40, a tape-shaped insulation material may be wound.

Effects Achieved by Second Embodiment

The second embodiment achieves the following effects in addition to effects similar to the effects achieved by the first embodiment.

According to the second embodiment, even when the wires both include the core wire, butt welding can be realized only by preparing the insulation tube.

Further, according to the second embodiment, the entire core wire 11 exposed from the insulation coating body 13 and the entire core wire 21 exposed from the insulation coating body 23 are housed inside the insulation tube 40. Therefore, it is unnecessary to prepare an additional insulation coating.

Third Embodiment: FIGS. 9A and 9B, FIGS. 10A to 10D, and FIG. 11

Next, an electric wire connection body 1C according to a third embodiment is described.

In the electric wire connection body 1C according to the third embodiment, a first electric wire 10C and a second electric wire 20C are connected by the connection portion 30 as illustrated in FIG. 10D. In the first embodiment and the electric wire connection body 1C, welding is performed by irradiation with the laser LA while an abutting state of the first electric wire 10C and the second electric wire 20C is maintained by using a jig 50 that allows the laser LA to pass therethrough in place of the insulation coating of the wires. Note that the electric wire connection body 1C has a simple form in which the first electric wire 10C and the second electric wire 20C each made of a conductor are joined by the connection portion 30. Therefore, description of the configuration of the electric wire connection body 1C is omitted, and a method of manufacturing the first electric wire 10C is first described.

[Method of Manufacturing Electric Wire Connection Body 1C: FIGS. 9A and 9B, FIGS. 10A to 10D, and FIG. 11]

A method of manufacturing the electric wire connection body 1C is described with reference to FIGS. 9A and 9B, FIGS. 10A to 10D, and FIG. 11.

As illustrated in FIG. 11, the manufacturing method includes the following steps.

S301: Step of aligning first electric wire and second electric wire to jig

S303: Step of abutting first electric wire and second electric wire, and fixing first electric wire and second electric wire by jig S305: Step of irradiating abutting portions with laser S307: Step of solidifying/joining portions irradiated with laser S309: Step of removing jig In the following, the steps are described in order of S301 to S309 with reference to FIGS. 9A and 9B, and FIGS. 10A to 10D.

Figure 9A:
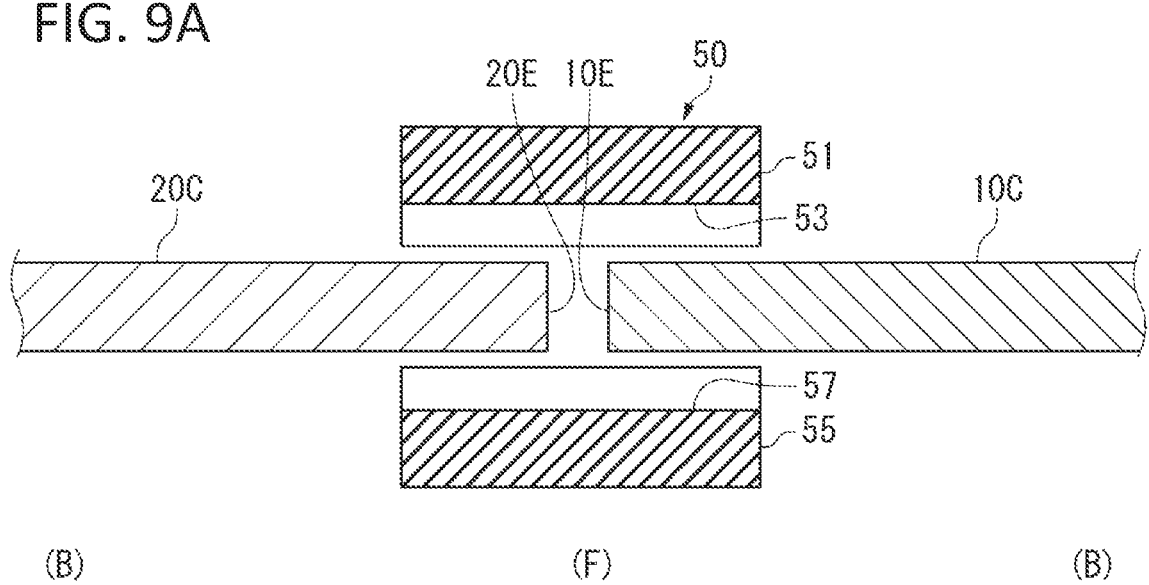
FIGS. 9A and 9B are diagrams each to explain a manufacturing method according to a third embodiment of the present invention.

<Step of Aligning First Electric Wire and Second Electric Wire to Jig (S301): FIG. 9A>

First, as illustrated in FIG. 9A, the first electric wire 10C and the second electric wire 20C are aligned to the jig 50. In the alignment, positions of center axes of the first electric wire 10C and the second electric wire 20C are aligned, and the front end surface 10E of the first electric wire 10C and the front end surface 20E of the second electric wire 20C are disposed between an upper mold 51 and a lower mold 55 of the jig 50 disposed with an interval so that the front end surface 10E and the front end surface 20E are disposed within a range of the jig 50. Driving sources for the upper mold 51 and the lower mold 55, and mechanisms connecting the driving sources to the upper mold 51 and the lower mold 55 are optional. Therefore, descriptions of the driving sources and the mechanisms are omitted. The third embodiment can be implemented when at least one of the upper mold 51 and the lower mold 55 can be moved upward or downward.

The jig 50 is described.

Figure 9B:
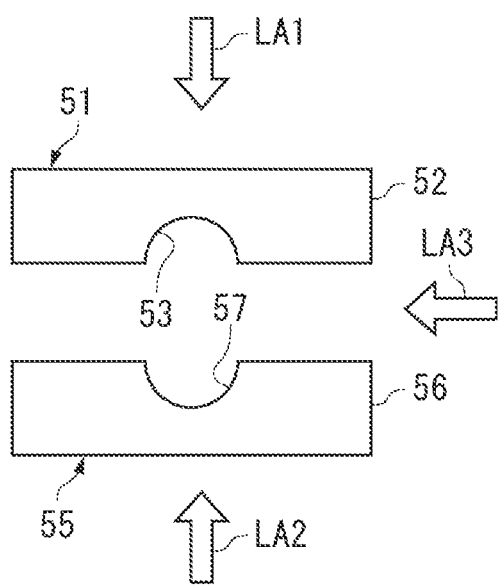

As illustrated in FIG. 9A and FIG. 9B, the jig 50 includes the upper mold 51 and the lower mold 55.

The upper mold 51 includes a mold main body 52 and a cavity 53 provided on a surface of the mold main body 52 facing the lower mold 55. The cavity 53 has an arc-shaped cross-sectional shape following outer shapes of the first electric wire 10C and the second electric wire 20C. Further, the cavity 53 is formed so as to penetrate through the upper mold 51 in a longitudinal direction.

The lower mold 55 includes a mold main body 56 and a cavity 57, and has the structure same as the upper mold 51 as illustrated in FIG. 9B. However, the lower mold 55 is upside down and is disposed such that the cavity 53 of the upper mold 51 and the cavity 57 of the lower mold 55 face each other.

Materials configuring the upper mold 51 and the lower mold 55 are selected in consideration of transmission of the laser LA. For example, in a case where laser LA1 is irradiated from above the upper mold 51 as illustrated in FIG. 9B, the upper mold 51 requires to be made of a material that allows the laser LA1 to pass therethrough; however, the lower mold 55 may be made of a material that does not allow the laser LA1 to pass therethrough. In contrast, in a case where laser LA2 is irradiated from below the lower mold 55 as illustrated in FIG. 9B, the lower mold 55 requires to be made of a material that allows the laser LA2 to pass therethrough; however, the upper mold 51 may be made of a material that does not allow the laser LA2 to pass therethrough. Further, in a case where laser LA3 is irradiated from a side of the upper mold 51 and the lower mold 55 as illustrated in FIG. 9B, both of the upper mold 51 and the lower mold 55 require to be made a material that allows the laser LA3 to pass therethrough. In this case, however, portions of the upper mold 51 and the lower mold 55 not directly irradiated with the laser LA3 may be made of a material that does not allow the laser LA3 to pass therethrough.

<Step of Fixing First Electric Wire and Second Electric Wire by Jig (S303): FIG. 10A>

After the first electric wire 10C and the second electric wire 20C are aligned to the jig 50, the front end surface 10E of the first electric wire 10C and the front end surface 20E of the second electric wire 20C are abutted on each other. The first electric wire 10C and the second electric wire 20C to be abutted on each other are disposed in a range of projection surfaces of the cavity 53 of the upper mold 51 and the cavity 57 of the lower mold 55. In a state where the first electric wire 10C and the second electric wire 20C abut on each other, one or both of the upper mold 51 and the lower mold 55 are moved so as to eliminate the interval between the upper mold 51 and the lower mold 55. As a result, the first electric wire 10C and the second electric wire 20C are fixed by the jig 50, and preparation for irradiation with the laser LA is completed.

<Step of Irradiating Abutting Portions with Laser (S305): FIG. 10B>

After the first electric wire 10C and the second electric wire 20C are fixed by the jig 50, the abutting portions of the first electric wire 10C and the second electric wire 20C and vicinities thereof are irradiated with the laser LA, and portions of the first electric wire 10C and the second electric wire 20C irradiated with the Laser LA and vicinities thereof are accordingly melted. When the melted portions are solidified thereafter, the first electric wire 10C and the second electric wire 20C are joined.

<Step of Solidifying/Joining Portions Irradiated with Laser (S307): FIG. 10C>

After a predetermined time elapses, irradiation with the laser LA is finished. As the metal materials configuring the melted first electric wire 10C and the melted second electric wire 20C are cooled and solidified, the connection portion 30 is formed as illustrated in FIG. 10C.

<Step of Removing Jig (S309): FIG. 10D>

After the connection portion 30 is formed, the upper mold 51 and the lower mold 55 are retreated from the first electric wire 10C and the second electric wire 20C, and the jig 50 is removed to obtain the electric wire connection body 1C as illustrated in FIG. 10D.

In a case where electric insulation of the first electric wire 10C and the second electric wire 20C including the connection portion 30 is necessary in the obtained electric wire connection body 1C, it is sufficient to coat the electric wire connection body 1C with a tape-shaped insulation material (such as fluorine resin).

Effects Achieved by Third Embodiment

The third embodiment achieves the following effects in addition to effects similar to the effects achieved by the first embodiment.

According to the third embodiment, even when both of the electric wires do not include insulation coating, the electric wire connection body 1C can be obtained by using the jig 50.

Fourth Embodiment: FIGS. 12A to 12D, FIGS. 13A to 13D, and FIG. 14

Next, a fourth embodiment is described.

The fourth embodiment is similar to the first embodiment in formation of the pocket 12, and an electric wire connection body 1D (FIG. 13D) including a configuration similar to the configuration of the electric wire connection body 1A obtained in the first embodiment can be obtained. However, the fourth embodiment is different in method of forming the pocket 12 from the first embodiment. A method of manufacturing the electric wire connection body 1D according to the fourth embodiment is described below.

[Method of Manufacturing Electric Wire Connection Body 1D: FIGS. 12A to 12D, FIGS. 13A to 13D, and FIG. 14]

The method of manufacturing the electric wire connection body 1D is described with reference to FIGS. 12A to 12D, FIGS. 13A to 13D, and FIG. 14.

Figure 14:
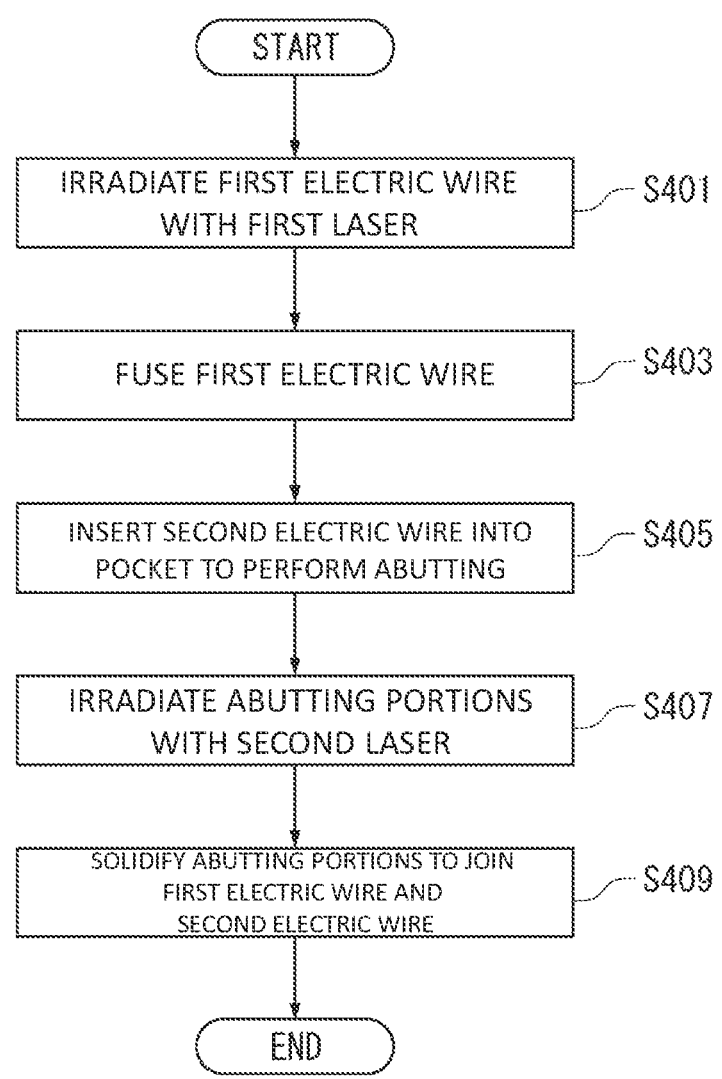
FIG. 14 is a flowchart illustrating a procedure of the manufacturing method according to the fourth embodiment.

As illustrated in FIG. 14, the manufacturing method includes the following steps.

S401: Step of irradiating first electric wire with first laser

S403: Step of fusing and removing front end side of portion melted by laser irradiation S405: Step of inserting front end part of second electric wire into pocket S407: Step of irradiating abutting portions with second laser S409: Step of solidifying and joining portions irradiated with laser In the following, the steps are described in order of S401 to S411 with reference to FIGS. 12A to 12D, FIGS. 13A to 13D.

<Step of Irradiating First Laser (S401): FIGS. 12A, 12B, and 12C>

As illustrated in FIG. 12A, a first electric wire 10D prepared in the fourth embodiment includes the core wire 11 exposed from a front end surface 13E of the insulation coating body 13. An exposed dimension is a dimension enabling the core wire 11 to be grasped and pulled at the time of fusing performed later.

The laser LA is irradiated from above the insulation coating body 13 of the first electric wire 10D from which the core wire 11 is exposed. As illustrated in FIG. 12B, the laser LA is irradiated to a position separated by a predetermined distance from the front end surface 13E of the insulation coating body 13 toward the rear side (B) of the first electric wire 10D. The position satisfies a minimum requirement that a portion melted by irradiation with the laser LA does not reach the front end surface 13E of the insulation coating body 13.

As illustrated in FIG. 12C, a melted region MP is formed in the core wire 11 by irradiation with the laser LA. The melted region MP is a starting point of the next fusing step.
<Step of Fusing and Removing Front End Side of Melted Portion (S403): FIG. 12D>

Figure 13A:
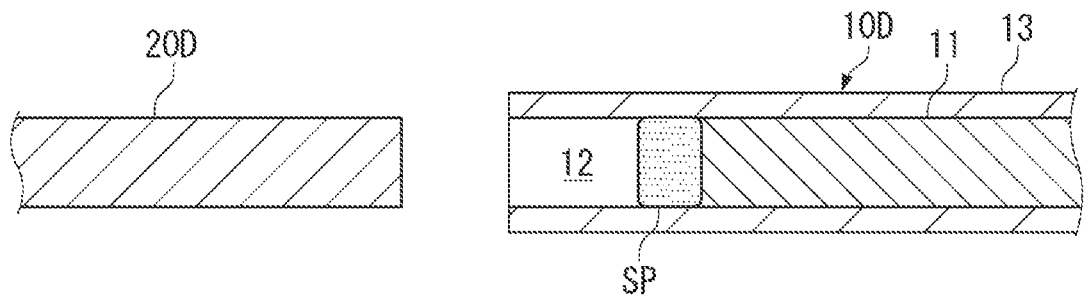
FIGS. 13A to 13D are diagrams each to explain the manufacturing method according to the fourth embodiment, subsequent to FIG. 12D.
Figure 13B:
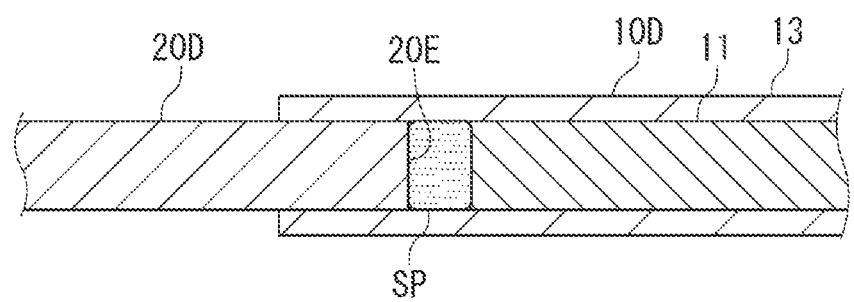

While the melted region MP is formed by irradiation with the laser LA, the portion of the core wire 11 exposed from the insulation coating body 13 is pulled toward the front side (F) of the first electric wire 10D including the insulation coating body 13 as illustrated in FIG. 12D. As a result, the portion on the front side (F) of the melted region MP is separated to fuse the core wire 11. Thereafter, portions corresponding to the melted region MP are cooled to form solidified portions SP. A portion where the separated core wire 11 has existed inside the insulation coating body 13 becomes the pocket 12. As described above, in the fourth embodiment, the pocket 12 is formed by fusing the core wire 11 housed in the insulation coating body 13.
<Step of Inserting Second Electric Wire into Pocket (S405): FIGS. 13A and 13B>

After the pocket 12 is formed in the first electric wire 10A, the second electric wire 20A to be joined with the first electric wire 10A is inserted into the pocket 12. The insertion is performed such that the front end surface 20E of the second electric wire 20A abuts on the solidified portion SP of the first electric wire 10A as illustrated in FIG. 13B.

Figure 13C:
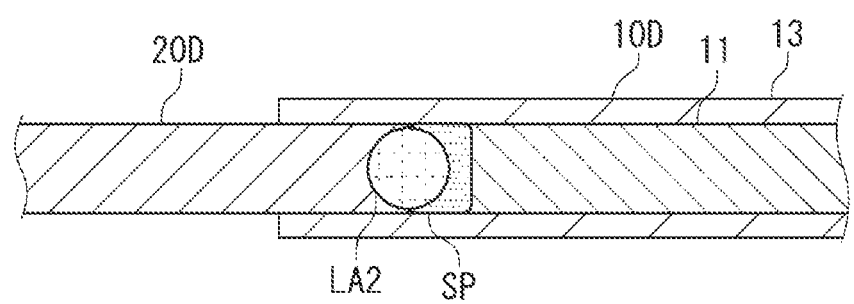

During the process of inserting the second electric wire 20A and abutting the second electric wire 20A on the solidified portion SP, the insulation coating body 13 around the pocket 12 functions as a guide for the second electric wire 20A. Therefore, according to the present embodiment, once the second electric wire 20A is inserted into the pocket 12, the front end surface 20E of the second electric wire 20A and the solidified portion SP are easily aligned. The example in which the outer diameter (R11) of the core wire 11 of the first electric wire 10A and the outer diameter (R20) of the second electric wire 20A are equal to each other is illustrated; however, the guide function of the pocket 12 and the insulation coating body 13 is effective even when the outer diameter (R20) of the second electric wire 20A is smaller than the outer diameter (R11) of the core wire 11.
<Step of Irradiating Second Laser (S407): FIG. 13C>

Figure 13D:
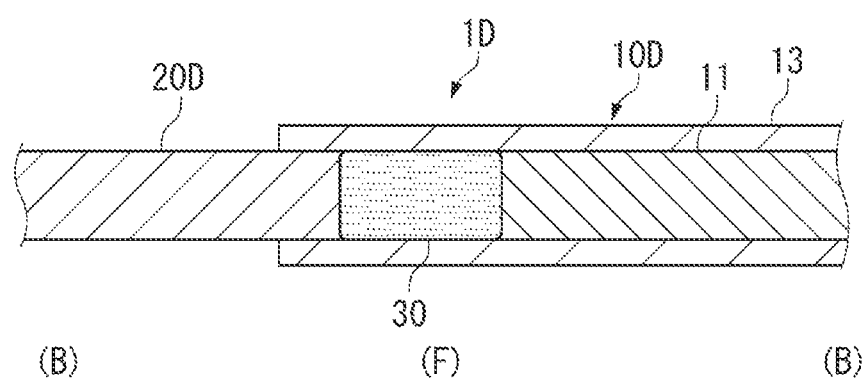

After the front end surface 20E of the second electric wire 20A abuts on the solidified portion SP of the first electric wire 10A, the abutting portions and vicinities thereof between the second electric wire 20A and the solidified portion SP are irradiated with the second laser LA2 as illustrated in FIG. 13C. By irradiation with the second laser LA2, a laser irradiation region and a vicinity thereof of the second electric wire 20A and the solidified portion SP are melted, and the second electric wire 20A and the core wire 11 are joined through subsequent solidification. The second laser LA2 can follow the first laser LA1.
<Step of Solidifying/Joining Portions Irradiated with Laser (S409): FIGS. 13C and 13D>

After a predetermined time elapses and irradiation with the second laser LA2 is finished, the connection portion 30 is formed as the metal materials configuring the melted second electric wire 20A and the melted core wire 11 are cooled. As a result, the electric wire connection body 1D can be obtained. In the electric wire connection body 1D, the connection portion 30 is disposed inside the insulation coating body 13.

Effects Achieved by Fourth Embodiment

The fourth embodiment achieves the following effects in addition to effects similar to the effects achieved by the first embodiment.

According to the fourth embodiment, the connection portion 30 is disposed in the inside of the insulation coating body 13 from the end surface of as illustrated in FIG. 13D. As a result, the insulation coating body 13 serves as the guide to stabilize formation of the connection portion 30. Further, if the second electric wire 20D includes an insulation coating body, an insulation structure can be easily formed as a whole of the electric wire connection body 1D. In other words, even in a case where the second electric wire 20D includes the insulation coating body, the insulation coating body of the second electric wire 20D is absent at the connection portion 30. The portion not including the insulation coating body can be easily inserted into the insulation coating body 13 of the first electric wire 10D, which facilitates formation of the insulation structure as the whole of the connection body.

Figure 15:
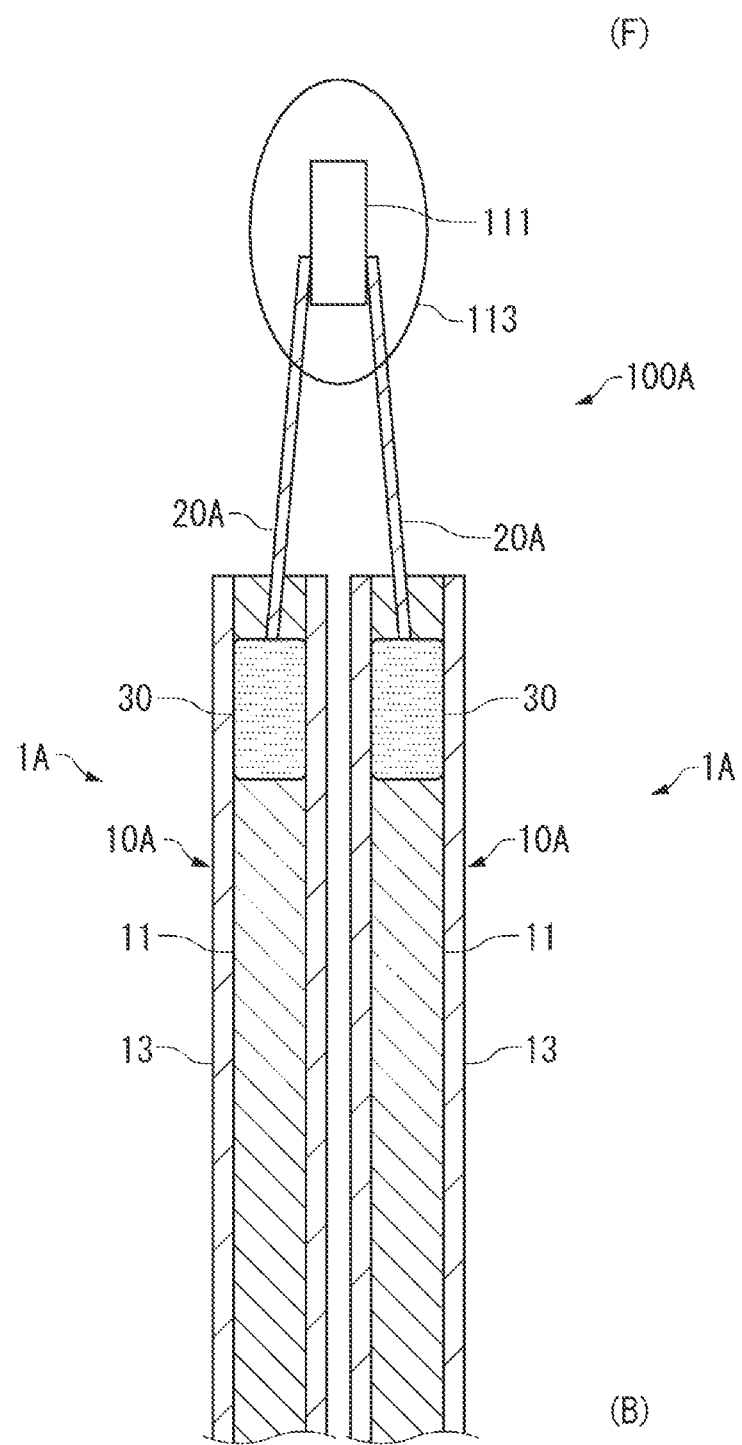
FIG. 15 is a diagram illustrating a specific application example of the electric wire connection body according to the present invention.
Figure 16:
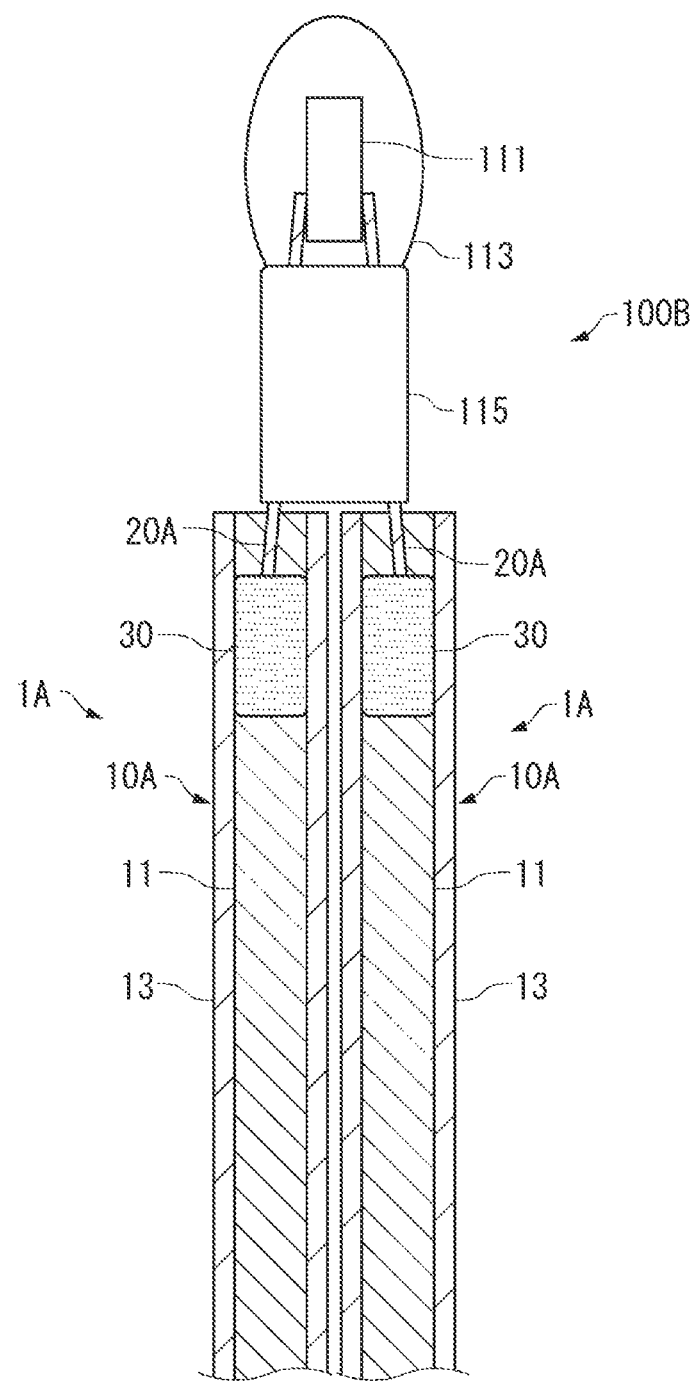
FIG. 16 is a diagram illustrating another specific application example of the electric wire connection body according to the present invention.

Application Examples of Electric Wire Connection Bodies 1A to 1D: FIG. 15 and FIG. 16

Next, two specific application examples of the electric wire connection bodies 1A to 1D according to the first to fourth embodiments are described. The application examples described here both relate to a temperature sensor element.

First Application Example (Temperature Sensor Element 100A): FIG. 15

As illustrated in FIG. 15, a temperature sensor element 100A according to a first application example includes a thermosensitive body 111 as a detector, a protective layer 113 made of glass and covering a periphery of the thermosensitive body 111, and paired electric wire connection bodies 1A electrically connected to the thermosensitive body 111.

Each of the electric wire connection bodies 1A includes the first electric wire 10A and the second electric wire 20A as described in the first embodiment. The first electric wire 10A includes the core wire 11 and the insulation coating body 13 covering the core wire 11, and the core wire 11 is a twisted wire. The second electric wire 20A is a single wire not including an insulation coating. The second electric wire 20A has a smaller wire diameter than the core wire 11 of the first electric wire 10A. For example, the core wire 11 has the wire diameter (diameter) of 0.36 mm, whereas the second electric wire 20A has the wire diameter of 0.07 mm.

Note that in the temperature sensor element 100A, a side on which the thermosensitive body 111 is provided is defined as a front side F, and a side on which the first electric wires 10A are drawn out is defined as a rear side B as illustrated in FIG. 15. The definition is relative definition.

[Thermosensitive Body 111]

As the thermosensitive body 111, for example, a thermistor is preferably used. The thermistor is an abbreviation for a thermally sensitive resistor, is made of a metal oxide, and detects a temperature by using property that electric resistance is varied with the temperature.

The thermistor is classified into an NTC (negative temperature coefficient) thermistor and a PTC (positive temperature coefficient) thermistor. Any of the thermistors can be used in the present invention.

[Protective Layer 113]

As illustrated in FIG. 15, the protective layer 113 made of glass prevents generation of chemical change and physical change of the thermosensitive body 111 derived from a condition of a surrounding environment where the temperature sensor element 100A is used, and mechanically protects the thermosensitive body 111 by sealing and holding the thermosensitive body 111 in an airtight state.

The protective layer 113 made of glass covers front ends of the second electric wires 20A, 20A in addition to the whole of the thermosensitive body 111, to seal the second electric wires 20A, 20A.

[First Electric Wire 10A]

As illustrated in FIG. 15, each of the first electric wires 10A includes the core wire 11 made of a conductor, and the insulation coating body 13 covering the core wire 11. The paired first electric wires 10A are referred to as a twin-core parallel wire or are simply referred to as a parallel wire. The core wire 11 of each of the first electric wires 10A is connected to the second electric wire 20A through the connection portion 30 by welding.

The core wires 11 of the first electric wires 10A are not restricted in linear expansion coefficient unlike the second electric wires 20B, and an optional material can be selected for the core wires 11 of the first electric wires 10A as long as the material has predetermined heat resistance and predetermined durability.

[Second Electric Wire 20A]

As illustrated in FIG. 15, the second electric wires 20A applied to the temperature sensor element 100A are electrically connected to unillustrated electrodes of the thermosensitive body 111.

Since the second electric wires 20A are sealed by the protective layer 113 made of glass, a Dumet wire having a linear expansion coefficient close to a linear expansion coefficient of glass is preferably used for the second electric wires 20A. The Dumet wire is an electric wire in which an alloy mainly containing iron and nickel is used for a core wire as a conductor, and the core wire is covered with copper.

Other Additional Elements

The temperature sensor element 100A can include elements other than the above-described elements.

For example, the temperature sensor element 100A can include a protective tube covering a main part of the temperature sensor element 100A, and a filler interposed between the temperature sensor element 100A and the protective tube.

The protective tube is preferably made of copper or a copper alloy having high thermal conductivity. The protective tube protects the temperature sensor element 100A housed therein from an ambient atmosphere, and rapidly transmits a temperature of the ambient atmosphere into an inside.

Second Application Example (Temperature Sensor Element 100B): FIG. 16

As illustrated in FIG. 16, a temperature sensor element 100B according to a second application example includes the thermosensitive body 111, the protective layer 113 made of glass and covering the periphery of the thermosensitive body 111, and the paired electric wire connection bodies 1A directly electrically connected to the thermosensitive body 111. These elements are common to the temperature sensor element 100A. The temperature sensor element 100B further includes a protective tube 115 made of ceramics on a rear end side of the protective layer 113 made of glass.

As illustrated in FIG. 16, the protective tube 115 is joined with a rear end part of the protective layer 113 from which the second electric wires 20A are drawn out, thereby mechanically reinforcing the protective layer 113 and improving electric insulation property and mechanical strength.

The protective tube 115 is made of a sintered body of, for example, alumina ($Al_2O_3$) or silicon nitride ($Si_3N_4$) higher in mechanical strength than the protective layer 113. The protective tube 115 includes unillustrated through holes into which the two respective second electric wires 20A are inserted.

Each of the second electric wires 20A has a wire diameter of about 0.1 mm to about 1.0 mm as an example. Each of the core wires 11 has a wire diameter of about 0.5 mm to about 2.0 mm as an example.

Although the preferred embodiments of the present invention are described above, the configurations described in the above-described embodiments can be selected or may be replaced with other configurations without departing from the spirit of the present invention.

For example, in the above-described embodiments, the temperature sensor element is an application target; however, the electric wire connection bodies according to the present invention are applicable to other targets. The electric wire connection bodies according to the present invention are usable for, for example, a microheater, a luminous body, a vibrator, and a micromotor.

REFERENCE SIGNS LIST 1A, 1B, 1C, 1D Electric wire connection body
10A, 10B, 10C, 10D First electric wire
11, 21 Core wire
12 Pocket
13, 23 Insulation coating body
20A, 20B, 20C, 20D Second electric wire
21 Core wire
23 Insulation coating body
30 Connection portion
40 Insulation tube
50 Jig
51 Upper mold
52 Mold main body
53 Cavity
55 Lower mold
56 Mold main body
57 Cavity
100A, 100B Temperature sensor element
111 Thermosensitive body
113 Protective layer

The invention claimed is:

1. A method of manufacturing an electric wire connection body in which a first electric wire and a second electric wire are connected by butt welding, the method comprising:
an abutting step of abutting a front end surface of the first electric wire and a front end surface of the second electric wire on each other; and
an irradiation step of irradiating the first electric wire and the second electric wire abutted on each other, with laser to form a connection portion by welding,
wherein at least before the irradiation step, a region where the connection portion is to be formed is covered with an insulation coating body,
wherein the insulation coating body is an insulation coating body provided on one of the first electric wire and the second electric wire in advance, and
wherein after a pocket formation step of forming a gap where no core wire is present inside the insulation coating body by irradiating a core wire covered with the insulation coating body with laser through the insulation coating body, the abutting step of abutting the front end surface of the first electric wire and the front end surface of the second electric wire on each other is performed in the gap.

2. The method of manufacturing the electric wire connection body according to claim 1, wherein the electric wire connection body comprises:
the first electric wire;
the second electric wire electrically connected to the first electric wire;
the connection portion connecting the first electric wire and the second electric wire; and
the insulation coating body covering a periphery of the connection portion.

3. The method of manufacturing the electric wire connection body according to claim 2, wherein
the insulation coating body has an inner diameter equivalent to a wire diameter of one of the first electric wire and the second electric wire, and
the connection portion has a wire diameter equivalent to a wire diameter of one of the first electric wire and the second electric wire.

4. The method of manufacturing the electric wire connection body according to claim 2, wherein the insulation coating body is made of a fluorine resin or glass.

5. The method of manufacturing the electric wire connection body according to claim 2, wherein the insulation coating body of the first electric wire has lower laser absorptivity than laser absorptivity of the core wire of the first electric wire.

6. The method of manufacturing the electric wire connection body according to claim 1, wherein, in the pocket formation step, the gap is formed by reduction in volume with melting and solidification of the core wire caused by irradiation of a front end part of the core wire with the laser.

7. The method of manufacturing the electric wire connection body according to claim 1, wherein, in the pocket formation step, the gap is formed by fusing the core wire by irradiation of the core wire with the laser, and removing the core wire on a front end side of a fused part.

8. The method of manufacturing the electric wire connection body according to claim 1, wherein
the insulation coating body is formed by a jig made of a material allowing the laser to pass therethrough, the jig being provided separately from an insulation coating body of each of the first electric wire and the second electric wire,
in the abutting step, an exposed core wire of the first electric wire and an exposed core wire of the second electric wire are abutted on each other inside the jig, and
in the irradiation step, the core wires are irradiated with the laser through the jig.

9. A method of manufacturing a sensor element in which paired electric wire connection bodies are electrically connected to a detector, wherein the electric wire connection bodies are connected to the detector by the method of manufacturing the electric wire connection body according to claim 1.

\* \* \* \* \*